(12) United States Patent
Ryu et al.

(10) Patent No.: US 11,335,010 B2
(45) Date of Patent: May 17, 2022

(54) METHODS FOR VIEWING AND TRACKING STORED ITEMS

(71) Applicant: Haier US Appliance Solutions, Inc., Wilmington, DE (US)

(72) Inventors: Choon Jae Ryu, Prospect, KY (US); Michael Goodman Schroeder, Louisville, KY (US); Andrew Poos, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 202 days.

(21) Appl. No.: 16/541,512

(22) Filed: Aug. 15, 2019

(65) Prior Publication Data

US 2021/0049775 A1 Feb. 18, 2021

(51) Int. Cl.
*G06T 7/246* (2017.01)
*G06T 7/73* (2017.01)
*G06V 40/20* (2022.01)

(52) U.S. Cl.
CPC ............... *G06T 7/248* (2017.01); *G06T 7/74* (2017.01); *G06V 40/28* (2022.01); *G06T 2207/10016* (2013.01); *G06T 2207/30196* (2013.01); *G06V 2201/07* (2022.01)

(58) Field of Classification Search
None
See application file for complete search history.

(56) References Cited

U.S. PATENT DOCUMENTS

| | | |
|---|---|---|
| 2013/0223673 A1 | 8/2013 | Davis et al. |
| 2014/0052555 A1 | 2/2014 | MacIntosh |
| 2014/0168396 A1 | 6/2014 | Kempiak et al. |
| 2016/0057394 A1* | 2/2016 | Marutani ............... F25D 23/04 348/143 |
| 2016/0088262 A1 | 3/2016 | Lee et al. |
| 2016/0182864 A1* | 6/2016 | Izawa .............. H04N 5/232939 348/159 |
| 2017/0299387 A1* | 10/2017 | Bryan ...................... G01B 3/06 |

FOREIGN PATENT DOCUMENTS

| | | |
|---|---|---|
| JP | 2017215067 A | 12/2017 |
| WO | WO2018020541 A1 | 2/2018 |
| WO | WO2018142136 A1 | 8/2018 |

* cited by examiner

*Primary Examiner* — Matthew C Bella
*Assistant Examiner* — Brian D Shin
(74) *Attorney, Agent, or Firm* — Dority & Manning, P.A.

(57) ABSTRACT

A method of operating a refrigerator, as provided herein, may include initiating a first image capture sequence at a camera module and identifying a first stored item based on a first two-dimensional image of the first image capture sequence. The method may further include determining an internal location of the first stored item within a chilled chamber or generating an expanded image of the first stored item and a second stored item spaced apart from the first stored item.

17 Claims, 13 Drawing Sheets

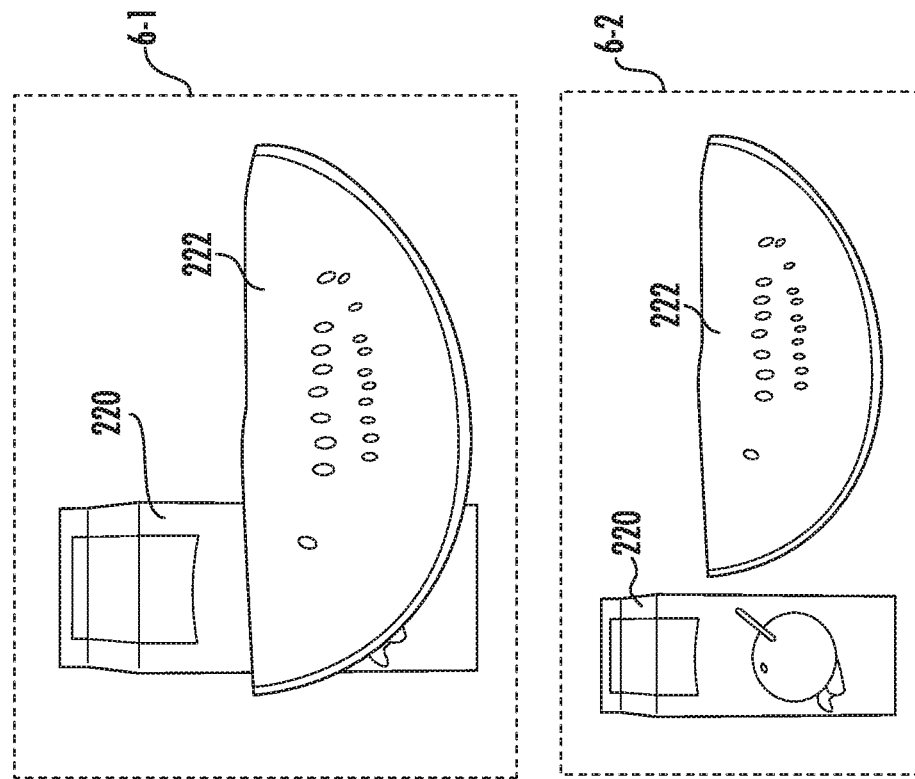
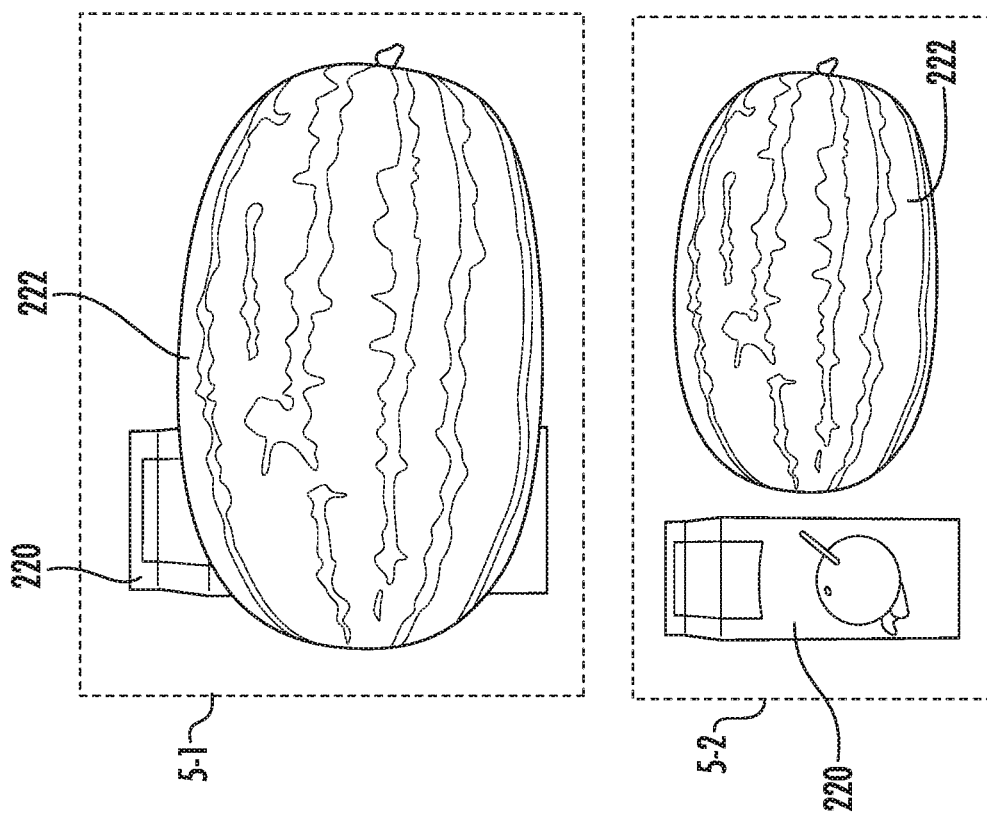

METHODS FOR VIEWING AND TRACKING STORED ITEMS

FIELD OF THE INVENTION

The present subject matter relates generally to viewing and tracking items within a storage enclosure, such as a refrigerator appliance.

BACKGROUND OF THE INVENTION

Storage enclosures, such as refrigerator appliances and pantries, generally provide an enclosed chamber for receiving multiple items or objects. For example, refrigerator appliances generally include a cabinet that defines a chilled chamber. A user can place food items or objects within the chilled chamber in order to hinder perishing of such food items. Thereby, a usable life of perishable items or objects can be increased.

Over time, a large volume or number of stored items (e.g., food items) can accumulate within the refrigerator's chilled chamber. As stored items accumulate, users of the refrigerator appliance can have difficulty identifying the items located within the refrigerator appliance. Additionally, user can also have difficulty determining a quantity of certain items within the refrigerator appliance. This is especially true when multiple users add/remove items from a common refrigerator appliance without communicating with other users. Consequently, the users may accidentally purchase additional items or more item than they desire. For example, certain food items do not readily perish within the chilled chamber, and such food items may be consumed infrequently. Thus, such food items can remain within the chilled chamber for extended periods of time. The users can forget about such food items and purchase replacements despite already having acceptable items. In such a manner, the users can be inconvenienced or expend money needlessly. Additionally or alternatively, some users may be unaware that certain items have been removed or consumed. Thus, users may fail to replace or replenish such items.

Accordingly, a refrigerator appliance with features for assisting a user with viewing or tracking contents of a chilled chamber of the refrigerator appliance would be useful. In particular, a refrigerator appliance with features for assisting a user with viewing or tracking contents of a chilled chamber of the refrigerator appliance in order to establish an inventory of stored items positioned within the chilled chamber would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating a refrigerator is provided. The method may include initiating a first image capture sequence at a camera module and identifying a first stored item based on a first two-dimensional image of the first image capture sequence. The method may further include determining an internal location of the first stored item within a chilled chamber based on a second two-dimensional image of the first image capture sequence. The second two-dimensional image of the first image capture sequence may be captured subsequent to the first two-dimensional image of the first image capture sequence. The method may also include recording a descriptor of the first stored item and the internal location of the first stored item.

In another exemplary aspect of the present disclosure, a method of operating a refrigerator is provided. The method may include initiating a first image capture sequence at a camera module and identifying a first stored item based on a first two-dimensional image of the first image capture sequence. The method may further include recording an image the first stored item. The method may also include initiating a second image capture sequence following the first image capture sequence and identifying a second stored item based on a first two-dimensional image of the second image capture sequence. The method may further include recording an image the second stored item and generating an expanded image of the first stored item and the second stored item spaced apart from the first stored item.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 5 illustrates a series of two-dimensional images of stored items on a shelf within a chilled chamber of a refrigerator appliance according to exemplary embodiments of the present disclosure.

FIG. 6 illustrates a series of two-dimensional images of stored items on a shelf within a chilled chamber of a refrigerator appliance according to exemplary embodiments of the present disclosure.

DETAILED DESCRIPTION

Figure 1:
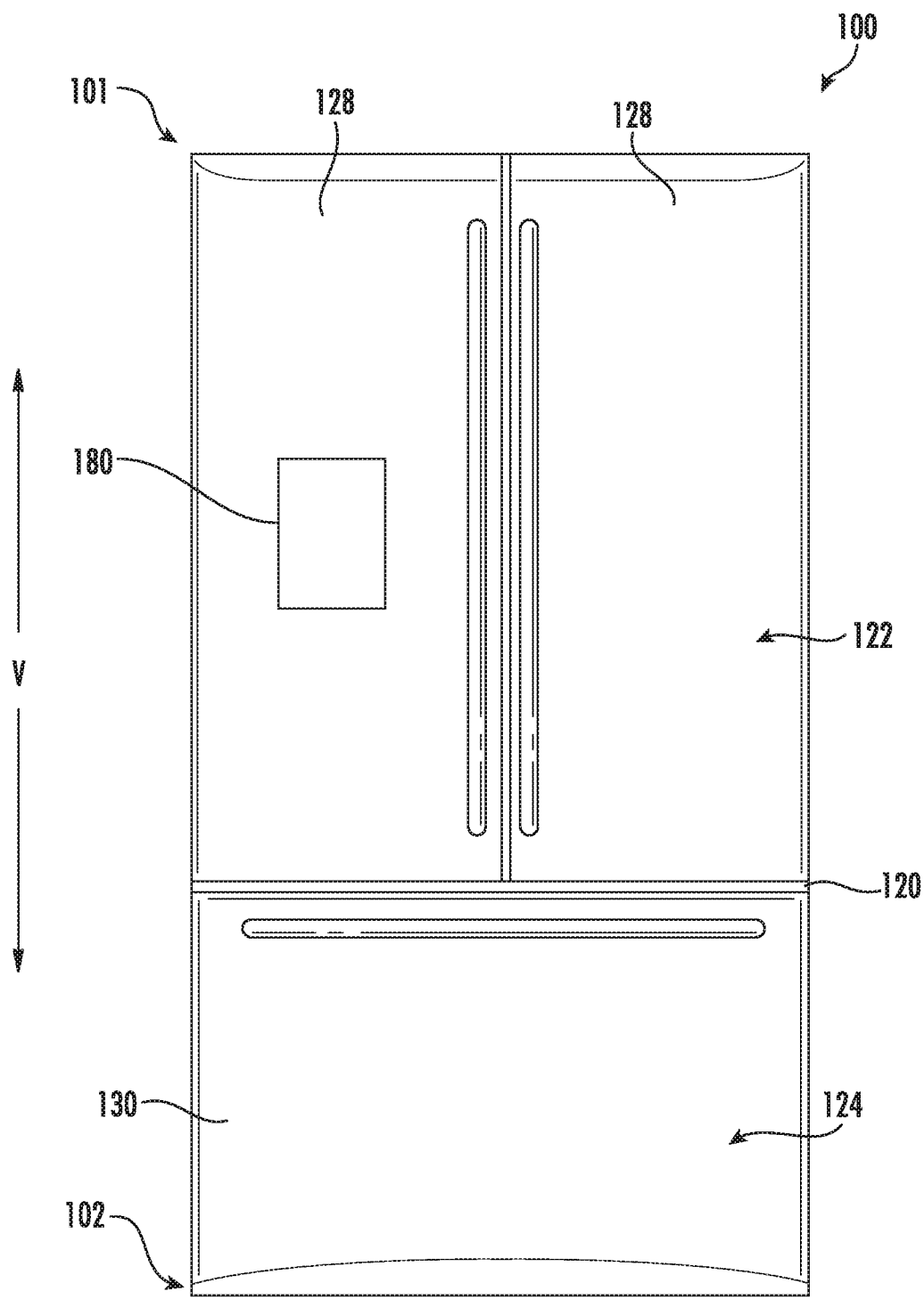
FIG. 1 provides a front elevation view of a refrigerator appliance according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Generally, the present disclosure provides methods to aid in managing an inventory for food items within a storage enclosure, such as a refrigerator appliance or pantry. The methods may include one or more steps for automatically (e.g., without direct user input) detecting what items (i.e., stored items) are added or removed from the storage enclosure. The methods may also include one or more steps for detecting where items are within the storage enclosure. For instance, the methods may automatically identify a specific shelf or drawer within which items are placed by a user. The methods may still further include one or more steps for generating new expanded images showing each item within the storage enclosure in a format that is relatively easy for a user to understand.

Figure 2:
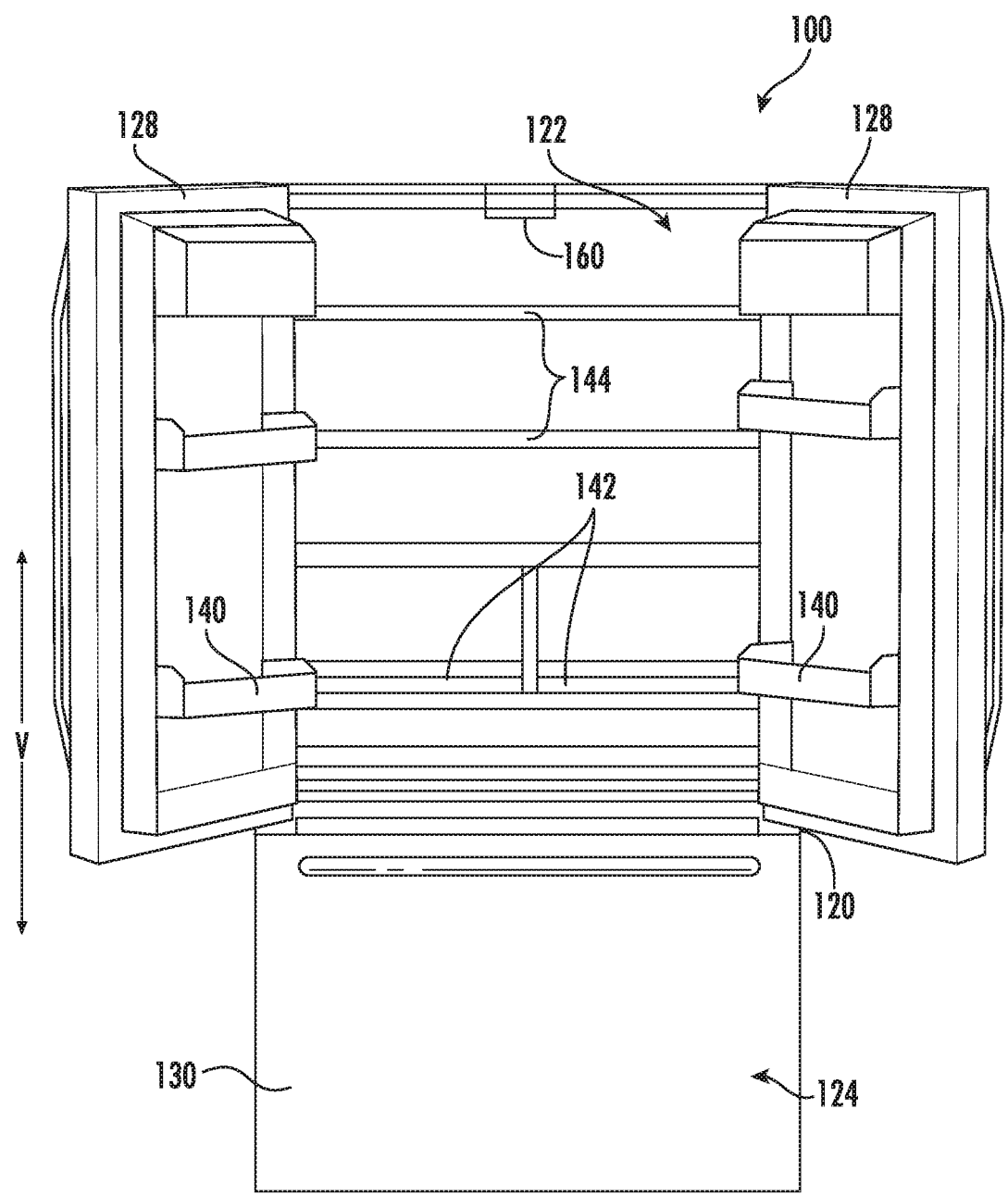
FIG. 2 provides a front elevation view of a refrigerator appliance according to exemplary embodiments of the present disclosure, wherein refrigerator doors are shown in an open position.

Turning now to the figures, FIG. 1 provides a front elevation view of a refrigerator appliance 100 according to exemplary embodiments of the present disclosure with refrigerator doors 128 of the refrigerator appliance 100 shown in a closed position. FIG. 2 provides a front view elevation of refrigerator appliance 100 with refrigerator doors 128 shown in an open position to reveal a fresh food chamber 122 of refrigerator appliance 100.

Refrigerator appliance 100 includes a cabinet or housing 120 that extends between a top 101 and a bottom 102 along a vertical direction V. Housing 120 defines chilled chambers for receipt of food items for storage. In particular, housing 120 defines fresh food chamber 122 positioned at or adjacent top 101 of housing 120 and a freezer chamber 124 arranged at or adjacent bottom 102 of housing 120. As such, refrigerator appliance 100 is generally referred to as a bottom mount refrigerator. It is recognized, however, that the benefits of the present disclosure apply to other types and styles of storage enclosure, such as a top mount refrigerator appliance, a side-by-side style refrigerator appliance, or an unrefrigerated pantry enclosure. Consequently, the description set forth herein is for illustrative purposes only and is not intended to be limiting in any aspect to any particular storage enclosure or refrigerator chamber configuration.

Refrigerator doors 128 are rotatably hinged to an edge of housing 120 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. As discussed above, refrigerator doors 128 and freezer door 130 are shown in the closed configuration in FIG. 1, and refrigerator doors 128 are shown in the open position in FIG. 2.

Turning now to FIG. 2, various storage components are mounted within fresh food chamber 122 to facilitate storage of food items therein as will be understood by those skilled in the art. In particular, the storage components include bins 140, drawers 142, and shelves 144 that are mounted within fresh food chamber 122. Bins 140, drawers 142, and shelves 144 are configured for receipt of stored items (e.g., beverages or solid food items) and may assist with organizing such food items. As an example, drawers 142 can receive fresh food items (e.g., vegetables, fruits, or cheeses) and increase the useful life of such fresh food items.

Refrigerator appliance 100 also includes features for assisting a user with identifying food items positioned within fresh food chamber 122 or freezer chamber 124. The user can utilize such features, for example, to view food items stored within fresh food chamber 122 or freezer chamber 124 or create an inventory of such food items. Such features are discussed in greater detail below.

Figure 3:
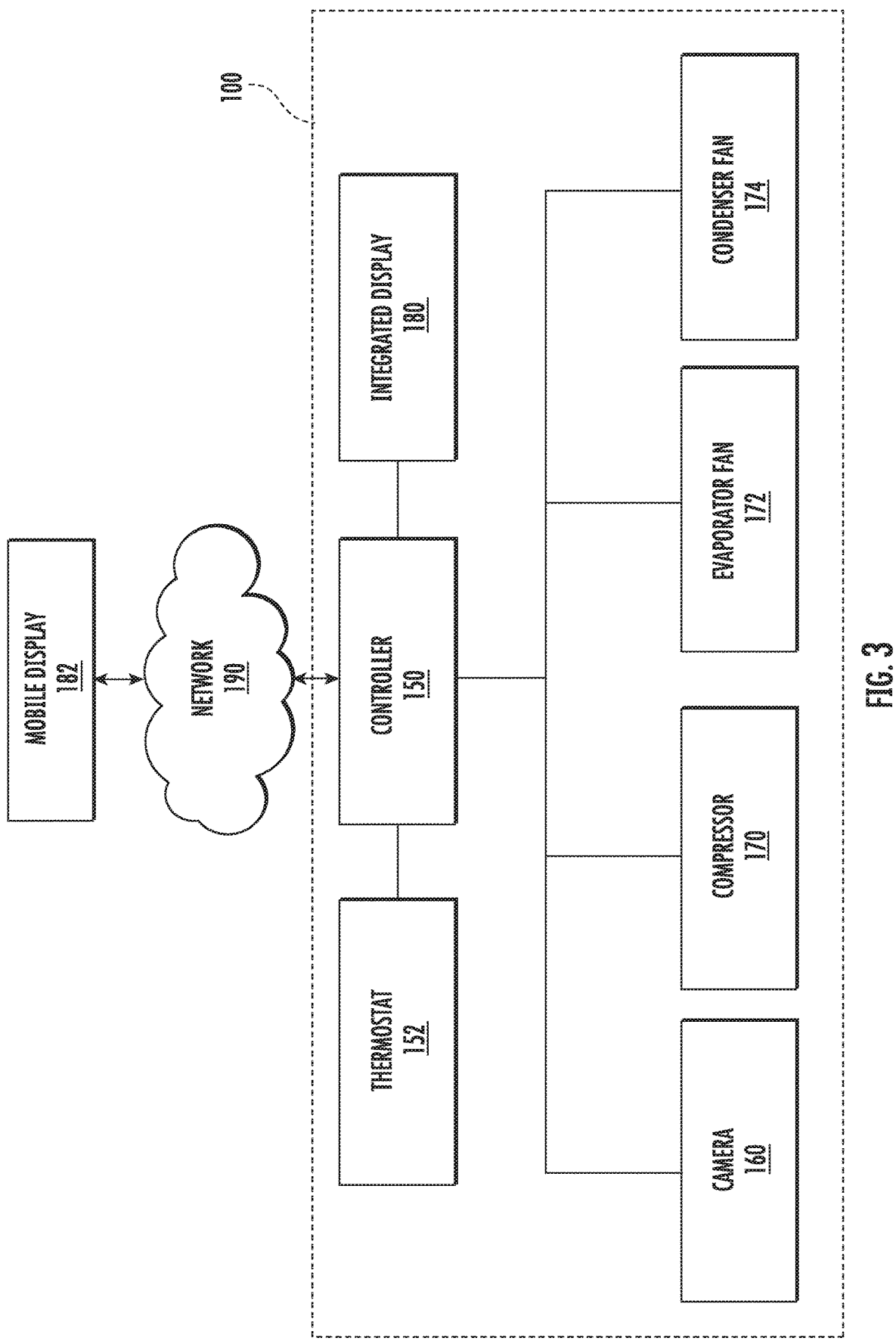
FIG. 3 provides a schematic view of a refrigerator appliance according to exemplary embodiments of the present disclosure.

FIG. 3 provides a schematic view of refrigerator appliance 100. Refrigerator appliance 100 includes a controller 150 that is operatively coupled or in communication with components of a refrigeration system (not shown) of refrigerator appliance 100 configured for cooling fresh food chamber 122 or freezer chamber 124. The components include a compressor 170, an evaporator fan 172, and a condenser fan 174. Controller 150 can selectively operate such components in order to cool fresh food chamber 122 or freezer chamber 124. Controller 150 is also in communication with a thermostat 152 (e.g., a thermocouple or thermistor). The thermostat may be positioned in fresh food compartment 122 or freezer compartment 124 (FIG. 2). Controller 150 may receive a signal from the thermostat that corresponds to a temperature of fresh food compartment 122 or freezer compartment 124. Controller 150 may also include an internal timer for calculating elapsed time periods.

Controller 150 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In some embodiments, the processor executes non-transitory programming instructions stored in memory. For certain embodiments, the instructions include a software package configured to operate appliance 100 or execute an operation routine (e.g., the exemplary methods 1300, 1400, and 1500 described below with reference to FIGS. 13 through 15). The memory may be a separate component from the processor or may be included onboard within the processor. Alternatively, controller 150 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

Controller 150 may be positioned in a variety of locations throughout refrigerator appliance 100. Input/output ("I/O") signals may be routed between controller 150 and various operational components of refrigerator appliance 100. One or more components of refrigerator appliance 100 may be in communication (e.g., electric communication) with controller 150 via one or more conductive signal lines or shared communication buses. Additionally or alternatively, one or more components of refrigerator appliance 100 may be in communication (e.g., wireless communication) with controller 150 via one or more wireless signal bands.

Refrigerator appliance 100 also includes a camera or camera module 160. Camera 160 may be any type of device suitable for capturing a two-dimensional picture or image, such as images illustrated in FIG. 4, FIG. 7 (e.g., 7-1), FIG. 10 (e.g., 10-1), and FIG. 11 (e.g., 11-1). As an example, camera 160 may be a video camera or a digital camera with an electronic image sensor [e.g., a charge coupled device (CCD) or a CMOS sensor]. When assembled, camera 160 is in communication (e.g., electric or wireless communication) with controller 150 such that controller 150 may receive a signal from camera 160 corresponding to the image captured by camera 160.

Generally, camera 160 is positioned within refrigerator appliance 100 and is directed toward one or more chilled chamber (e.g., fresh food chamber 122—FIG. 2). In some embodiments, camera 160 is mounted within fresh food chamber 122 at a top portion thereof (e.g., adjacent top 101). For instance, camera 160 may be fixed to or directed through a top wall of an internal liner defining fresh food chamber 122. In such embodiments, camera 160 may be directed downward, as illustrated in FIG. 2. When assembled, camera 160 may be directed towards at least a portion of any particular one of or combination of drawers 142 and shelves 144 (FIG. 2). Thus, camera 160 can capture images of one of drawers 142, all of drawers 142, one of shelves 144, all of shelves 144, or any suitable combination thereof.

In certain embodiments, refrigerator appliance 100 includes an integrated display 180. Integrated display 180 may be mounted on refrigerator door 128 (FIG. 1) or at any other suitable location on refrigerator appliance 100. Integrated display 180 is in communication with controller 150 such that integrated display 180 may receive a signal from controller 150 corresponding to an image captured by camera 160. Integrated display 180 can receive such signal from controller 150 and present the image to a user visually. Integrated display 180 may include, for example, a liquid crystal display panel (LCD), a plasma display panel (PDP), or any other suitable mechanism for displaying an image (e.g., a projector).

In additional or alternative embodiments, refrigerator appliance 100 includes a network interface (not shown) that couples refrigerator appliance 100 (e.g., controller 150) to a network 190 such that refrigerator appliance 100 can transmit and receive information over network 190. Network 190 can be any wired or wireless network such as a WAN, LAN, or HAN.

In some such embodiments, refrigerator appliance 100 (e.g., controller 150) is in communication with a mobile display 182 via network 190. Mobile display 182 can be any device configured to communicate over network 190 and display images received therefrom. For example, mobile display 182 may be a computer, a smartphone, or a tablet. Mobile display 182 is in communication with controller 150 such that mobile display 182 may receive a signal from controller 150 (via network 190) corresponding to a user interface or an image captured by camera 160. Mobile display 182 can receive such signal from controller 150 and present one or more images to a user visually. Mobile display 182 may include, for example, a liquid crystal display panel (LCD), a plasma display panel (PDP), or any other suitable mechanism for displaying an image (e.g., a projector). Mobile display 182 can also include an interface (e.g., tactile inputs, such as buttons, or a graphical user interface) that allows mobile display 182 to initiate communications with refrigerator appliance 100 over network 190.

During use, such as during an image capture sequence, camera 160 may capture one or more two-dimensional images (e.g., as a video feed or series of sequential static images) that may be transmitted to the controller 150 (e.g., as a data signal), as is generally understood. From the captured images, items (e.g., stored items, such as food, or non-stored items such as a user appendage, a shelf, a movable drawer, etc.) within the field of view for the camera 160 may be automatically identified by the controller 150. As is understood, recognizing or identifying such items, may be performed by edge matching, divide-and-conquer search, greyscale matching, histograms of receptive field responses, or another suitable routine (e.g., executed at the controller 150 based on one or more captured images from camera 160).

Figure 4:
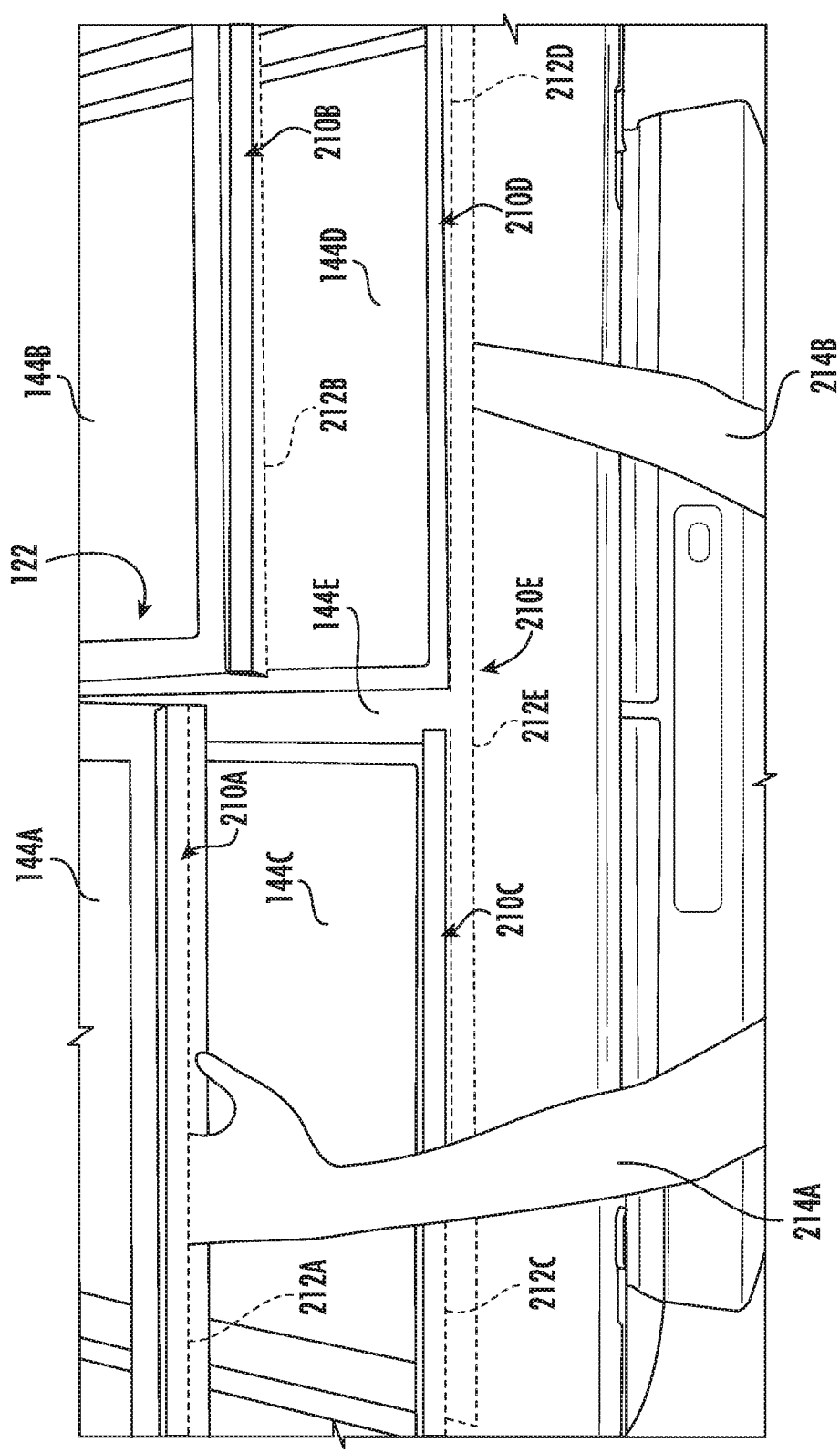
FIG. 4 illustrates an exemplary two-dimensional image of shelves within a fresh food chamber of a refrigerator appliance captured at a camera assembly of the refrigerator appliance according to exemplary embodiments of the present disclosure.

Turning now to FIGS. 4 through 6, various exemplary two-dimensional images related to shelf storage are illustrated, such as might be captured at camera 160 (FIG. 2), viewed at integrated display 180 (FIG. 3), or viewed at mobile display 182 (FIG. 3).

As an example, FIG. 4 illustrates an exemplary two-dimensional image such as might be captured at camera 160 as part of an image capture sequence. In other words, FIG. 4 illustrates a possible field of view for camera 160 directed toward a chilled chamber. As additional or alternative examples, FIGS. 5 and 6 both illustrate a separate series of exemplary two-dimensional images that might be viewed at display 180 or 182 after being isolated or generated from an initial image captured at camera 160 as part of an image capture sequence.

In certain embodiments, camera 160 and controller 150 are configured to capture multiple, sequential, two-dimensional images (e.g., at a predetermined rate or pattern) as part of an image capture sequence. Sequential images (e.g., a previously-captured image and a more-recently-captured image) may be recorded (e.g., temporarily) and compared at the controller 150. From the comparison, changes or differences between sequential images may be detected. In some embodiments, the image capture sequence is prompted or initiated in response to detected movement within a chilled chamber (e.g., fresh food chamber 122). The image capture sequence may subsequently be stopped or halted according to one or more end conditions, such as expiration of a predetermined time period, failure to detect further changes in sequential images, or closing of the door 128.

As shown in FIG. 4, at least a portion of multiple shelves 144A, 144B, 144C, 144D, 144E may be visible within the field of view for camera 160 (FIG. 2). Specifically, front edges 210A, 210B, 210C, 210D, 210E of the shelves 144A, 144B, 144C, 144D, 144E may be within the field of view for camera 160 (FIG. 2). Each front edge 210A, 210B, 210C, 210D, 210E may represent the forwardmost surface of a corresponding shelf 144A, 144B, 144C, 144D, 144E, which may be the shelf's surface most proximal to the opening of fresh food chamber 122. For example, as illustrated in FIG. 4, front edge 210A corresponds to shelf 144A, front edge 210B corresponds to shelf 144B, front edge 210C corresponds to shelf 144C, front edge 210D corresponds to shelf 144D, and front edge 210E corresponds to shelf 144E. In some embodiments, one or more of the shelves 144A, 144B, 144C, 144D, 144E are provided at different heights (i.e., relative vertical positions within fresh food chamber 122). Optionally, the camera 160 may be positioned forward from one or more of the shelves 144A, 144B, 144C, 144D, 144E. Thus, the front edges 210A, 210B, 210C, 210D, 210E of shelves 144A, 144B, 144C, 144D, 144E, which are at discrete heights within fresh food chamber 122, may be within the field of view for camera 160.

In certain embodiments, controller 150 is configured to identify a fiducial marker or region of one or more of the shelves 144A, 144B, 144C, 144D, 144E based on signals or images received from the camera 160 (e.g., during an image capture sequence). For instance, from the two-dimensional images captured from the camera 160, the controller 150 may identify a fiducial edge 212A, 212B, 212C, 212D, 212E of one or more of the shelves 144A, 144B, 144C, 144D, 144E. Optionally, a corresponding fiducial edge 212A, 212B, 212C, 212D, 212E may be identified for each shelf 144A, 144B, 144C, 144D, 144E. Together, the fiducial edges 212A, 212B, 212C, 212D, 212E may establish a vertical coordinate system within fresh food chamber 122. Using this vertical coordinate system, controller 150 may be able to determine what shelf 4A, 144B, 144C, 144D, 144E or between which vertically-adjacent shelves 144 (e.g., 144A and 144C), an item or a user appendage 214A, 214B (e.g., hand, arm, etc.). As an example, in the illustrated image of FIG. 4, a user's left arm 214A is shown to cross the fiducial edge 212C without crossing the higher fiducial edge 212A. Thus, it may be determined that the user's left arm 214A is passing between shelf 144A and shelf 144C. As an additional example, in the illustrated image of FIG. 4, a user's right arm 214B is shown to cross the fiducial edge 212E without crossing the higher fiducial edges 212D and 212B. Thus, it may be determined that the user's right arm 214B is passing between shelf 144D and shelf 144E.

Turning especially to FIGS. 5 and 6, in additional or alternative embodiments, controller 150 is configured to identify one or more stored items (e.g., during an image capture sequence). For instance, from the two-dimensional images captured from the camera 160, the controller 150 may identify one or more stored items (e.g., 220, 222) being added to or removed from of one or more of the shelves 144 (FIG. 2). Generally, controller 150 may be configured to initiate or execute an object-recognition sequence or algorithm to identify certain objects, as is understood. Optionally, controller 150 may recognize one or more stored items based on a sub-portion (i.e., less than the entirety) of the two-dimensional profile of the corresponding object. Thus, the controller 150 may calibrate portions of captured two-dimensional images to infer portions of one or more stored items that are hidden, blurred, or otherwise not visible in a captured two-dimensional image.

As an example, and as noted above, FIGS. 5 and 6 illustrate a series of exemplary two-dimensional images that might be viewed at display 180 or 182 after being isolated or generated from an initial image captured at camera 160 as part of an image capture sequence. Specifically, two-dimensional image 5-1 illustrates a pair of stored items 220, 222 captured while being placed into fresh food chamber 122. Two-dimensional image 5-2 illustrates an expanded image that has been generated (e.g., by controller 150 from two-dimensional image 5-1) and provides a first stored item 220 (e.g., juice box) spaced apart from a second stored item 222 (e.g., watermelon). Similarly, two-dimensional image 6-1 illustrates a pair of stored items 220, 222 captured while being placed into fresh food chamber 122 (e.g., after a portion of the second stored item 222 has been removed from the remaining portion thereof). Two-dimensional image 6-2 illustrates an expanded image that has been generated (e.g., by controller 150 from two-dimensional image 6-1) and provides the first stored item 220 spaced apart from a second stored item 222.

Although the second stored item 222 partially blocks or covers the first stored item 220 such that only a sub-portion of the first stored item 220 is visible in the captured images, the controller 150 may identify the first stored item 220 (e.g., as well as the second stored item 222). The remaining or blocked portion of the first stored item 220 may be inferred.

In certain embodiments, controller 150 may be configured to record a descriptor of the identified stored items (e.g., within an inventory of stored items detected within refrigerator appliance 100). As an example, the descriptor may include a string of text naming or generally describing the corresponding stored item. As an additional or alternative example, the descriptor may include an image corresponding to the stored item. Such an image of the descriptor may be a captured image (or portion thereof) from camera 160 or, alternatively, a preloaded image received from another remote source (e.g., a remote server). If provided as a preloaded image, the descriptor may provide an image of a substantially identical item. For example, if the stored item is identified as a carton of juice, the descriptor may provide a preloaded image of another (e.g., generic) carton of juice that would be easy for a user to visually distinguish or recognize.

Optionally, an expanded two-dimensional image (e.g., 5-2 or 6-2) may be generated showing the stored items spaced apart from each other such that a user may readily understand what stored items have been captured and identified. Such expanded images may be generated using portions of the captured two-dimensional images at the camera 160 (e.g., wherein captured portions of the stored items are isolated from each other and transferred to the expanded image) or from separate preloaded images stored or received at the controller 150 (e.g., wherein preloaded images of similar items are received from a remote server, such as an Internet server, and transferred to the expanded image).

Images for object recognition may be captured separate from or in addition to images capturing one or more appendages. In some embodiments, one or more determinations may be made (e.g., at controller 150) based on the order in which appendages and stored items are recognized. As an example, if a stored item is recognized or identified (e.g., during an image capture sequence) in a previously-captured image while an appendage (e.g., 214A, 214B) blocking one or more fiducial edges 212A, 212B, 212C, 212D, 212E is identified in a more-recently captured image, controller 150 may determine the stored item is being placed within fresh food chamber 122. Optionally, the internal location or shelf 144 at which the stored item is placed may be recorded (e.g., with or in addition to the corresponding descriptor of the stored item). As an additional or alternative example, if an appendage (e.g., 214A, 214B) blocking one or more fiducial edges 212A, 212B, 212C, 212D, 212E is recognized or identified (e.g., during an image capture sequence) in a previously-captured image while a stored item is recognized or identified is identified in a more-recently captured image, controller 150 may determine stored item is being removed from fresh food chamber 122.

Turning now to FIGS. 7 through 12, various exemplary two-dimensional images related to drawer storage are illustrated, such as might be captured at camera 160 (FIG. 2), viewed at integrated display 180 (FIG. 3), or viewed at mobile display 182.

Figure 7:
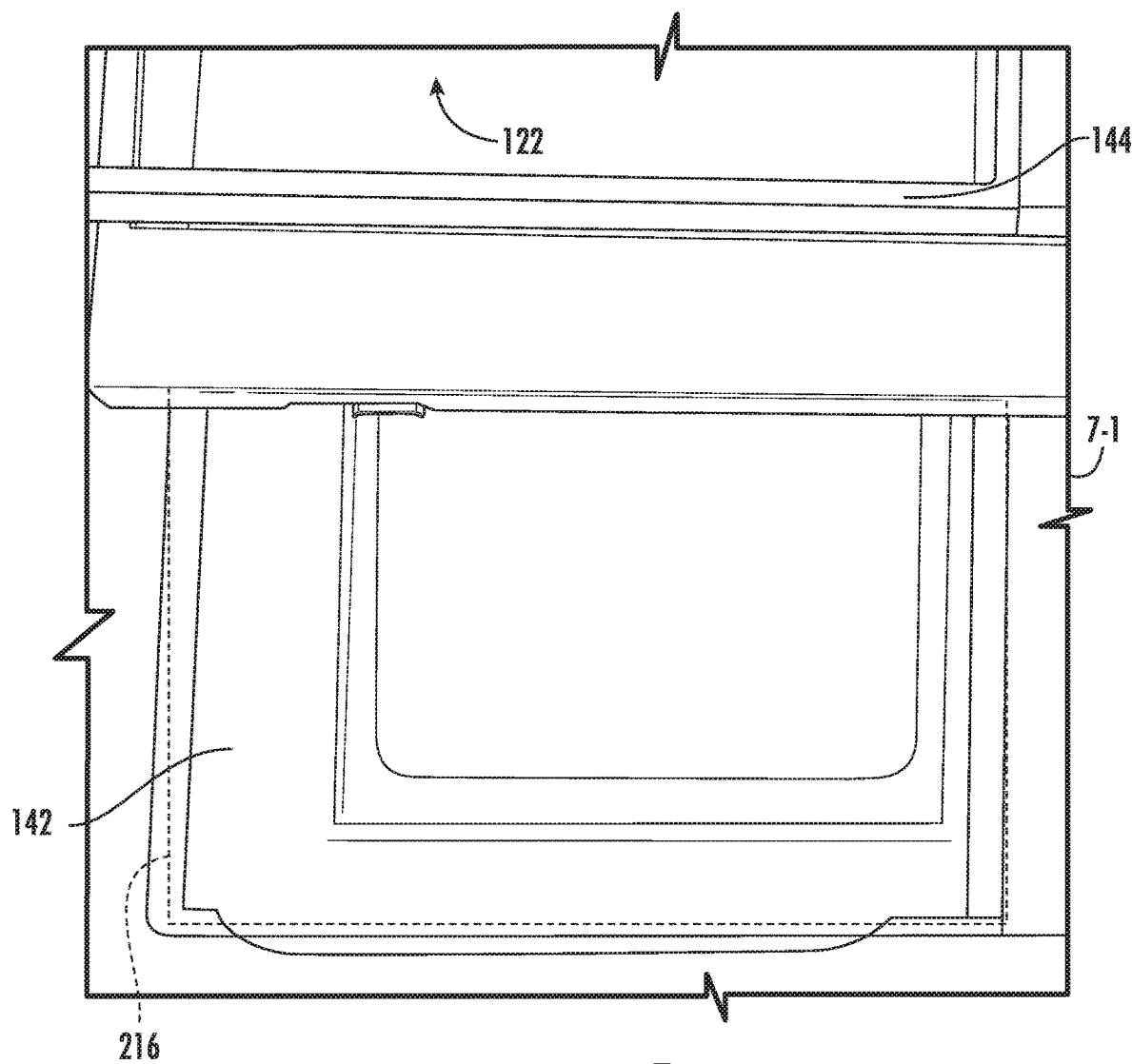
FIG. 7 illustrates an exemplary two-dimensional image of a drawer of a refrigerator appliance captured at a camera assembly of the refrigerator appliance according to exemplary embodiments of the present disclosure.
Figure 8:
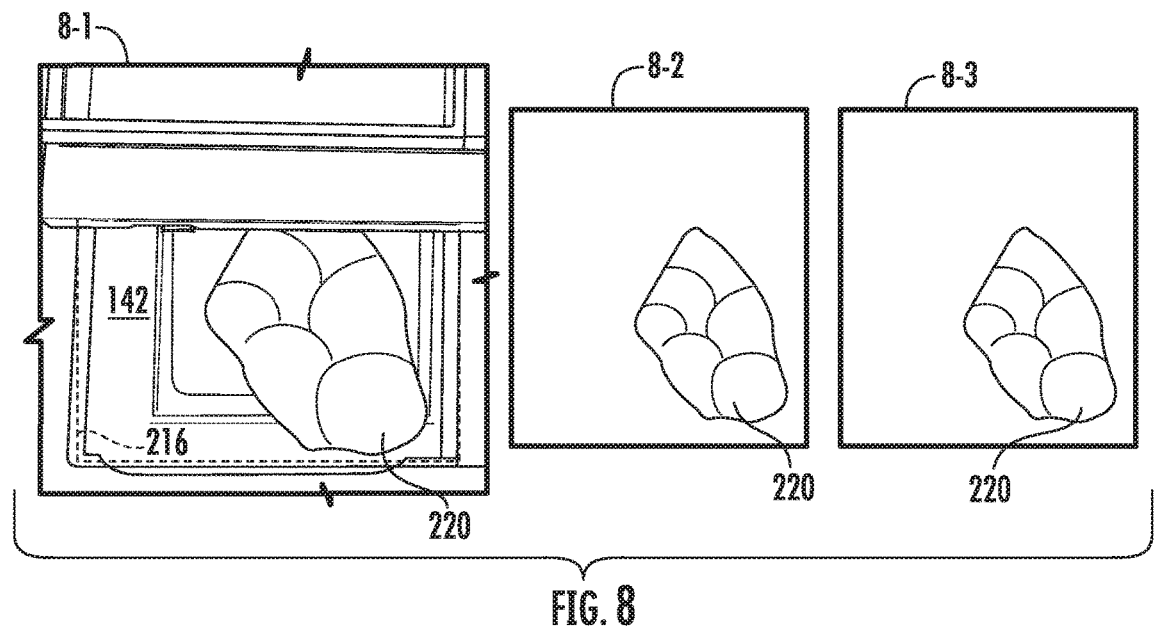
FIG. 8 illustrates a series of two-dimensional images of a stored item in a drawer of a refrigerator appliance according to exemplary embodiments of the present disclosure.

As an example, FIG. 7 illustrates an exemplary two-dimensional image 7-1 such as might be captured at camera 160 as part of an image capture sequence. In other words, image 7-1 illustrates a possible field of view (or portion thereof) for camera 160 directed toward fresh food chamber 122. As additional or alternative examples, FIGS. 8 through 11 illustrate separate series of exemplary two-dimensional images that might be viewed at display 180 or 182 after being isolated or generated from an initial image captured at camera 160 as part of an image capture sequence.

In certain embodiments, camera 160 and controller 150 are configured to capture multiple, sequential, two-dimensional images (e.g., at a predetermined rate or pattern) as part of an image capture sequence. Sequential images (e.g., a previously-captured image and a more-recently-captured image) may be recorded (e.g., temporarily) and compared at the controller 150. From the comparison changes or differences between sequential images may be detected. In some embodiments, the image capture sequence is prompted or initiated in response to detected movement within or forward from a chilled chamber (e.g., fresh food chamber 122). The image capture sequence may subsequently be stopped or halted according to one or more end conditions, such as expiration of a predetermined time period, failure to detect further changes in sequential images, or closing of the door 128.

In certain embodiments, controller 150 is configured to identify an opened state of at least one drawer 142 within fresh food chamber 122 based on signals or images received from the camera 160 (e.g., during an image capture sequence). For instance, from the two-dimensional images captured from the camera 160, the controller 150 may identify the drawer 142 has been positioned within a predetermined bounding zone 216 of the field of view of camera 160. In some such embodiments, the predetermined bounding zone 216 establishes a two-dimensional footprint or region that is fixed relative to fresh food chamber 122 (e.g., forward therefrom). Optionally, a corresponding predetermined bounding zone 216 may be identified for each drawer 142. Generally, the predetermined bounding zone 216 may establish a corresponding drawer 142 is no longer closed and is at least partially open to permit insertion or removal of stored items. As an example, in the illustrated image of FIG. 7, drawer 142 is received within the predetermined bounding zone 216. Thus, it may be determined that the drawer 142 is open or otherwise in an opened state such that items may pass to/from the storage area of drawer 142.

Turning especially to FIGS. 8 through 11, in additional or alternative embodiments, controller 150 is configured to identify one or more stored items (e.g., during an image capture sequence). For instance, from the two-dimensional images captured from the camera 160, the controller 150 may identify one or more stored items being added to or removed from drawer 142 (e.g., as such stored items pass to/from the predetermined bounding zone 216). Generally, controller 150 may be configured to initiate or execute an object-recognition sequence or algorithm to identify certain objects, as is understood. Optionally, controller 150 may recognize one or more stored items based on a sub-portion (i.e., less than the entirety) of the two-dimensional profile of the corresponding object. Thus, the controller 150 may calibrate portions of captured two-dimensional images to infer portions of one or more stored items that are hidden, blurred, or otherwise not visible in a captured image. Additionally or alternatively, and as will be further described below, controller 150 may determine or select a layer at which the items are placed within the drawer 142.

As an example, and as noted above, FIGS. 8 through 11 illustrate a series of exemplary two-dimensional images that might be viewed at display 180 or 182 after being isolated or generated from an initial image captured at camera 160 as part of an image capture sequence. Specifically, FIGS. 8 through 11 illustrate various two-dimensional captured images of stored items identified within the drawer 142, two-dimensional isolated images of identified stored items within selected vertical layers of the drawer 142, and two-dimensional expanded images of all corresponding identified stored items within drawer 142.

Generally, FIGS. 8 through 11 illustrate an exemplary progression of stored items being placed within drawer 142. Each of FIGS. 8 through 11 may be understood to illustrate, for example, additional stored items being placed within drawer 142 during a corresponding image capture sequence. For instance, turning especially to FIG. 8, two-dimensional image 8-1 illustrates a first stored item 220 (e.g., a bag of apples) captured within drawer 142 while drawer 142 is in the predetermined bounding zone 216. Two-dimensional image 8-2 illustrates a two-dimensional isolated image that has been generated (e.g., by controller 150 from two-dimensional image 8-1) to show an isolated first layer within which the first stored item 220 is held. Two-dimensional image 8-3 illustrates a two-dimensional expanded image that has been generated (e.g., by controller 150 from two-dimensional image 8-2) to show all of the stored items within drawer 142 at image 8-1 (i.e., first stored item 220).

Figure 9:
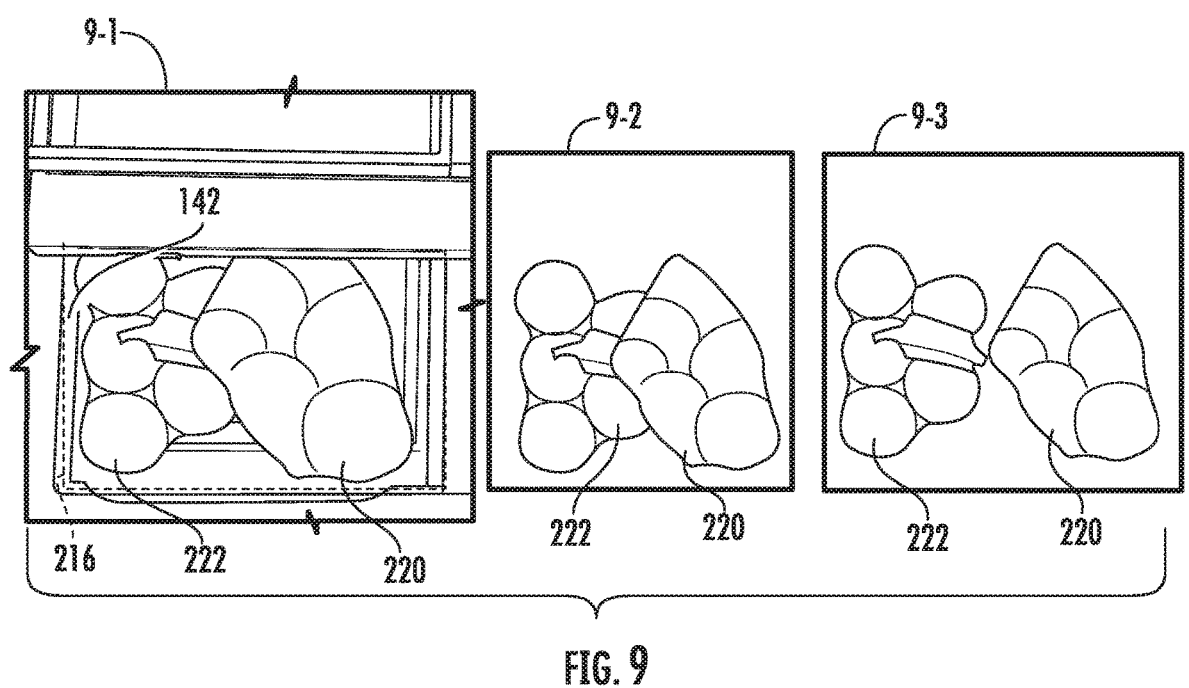
FIG. 9 illustrates a series of two-dimensional images of stored items in a drawer of a refrigerator appliance according to exemplary embodiments of the present disclosure.

Turning especially to FIG. 9, two-dimensional image 9-1 illustrates the first stored item 220 and a second stored item 222 (e.g., a bag of oranges) captured within drawer 142 (e.g., subsequent to 8-1) while drawer 142 is in the predetermined bounding zone 216. Two-dimensional image 9-2 illustrates a two-dimensional isolated image that has been generated (e.g., by controller 150 from two-dimensional image 9-1) to show an isolated first layer within which the first stored item 220 and second stored item 222 are held. Two-dimensional image 9-3 illustrates a two-dimensional expanded image that has been generated (e.g., by controller 150 from two-dimensional image 9-2) to show all of the stored items within drawer 142 at image 9-1 (i.e., first stored item 220 and second stored item 222) spaced apart from each other.

Figure 10:
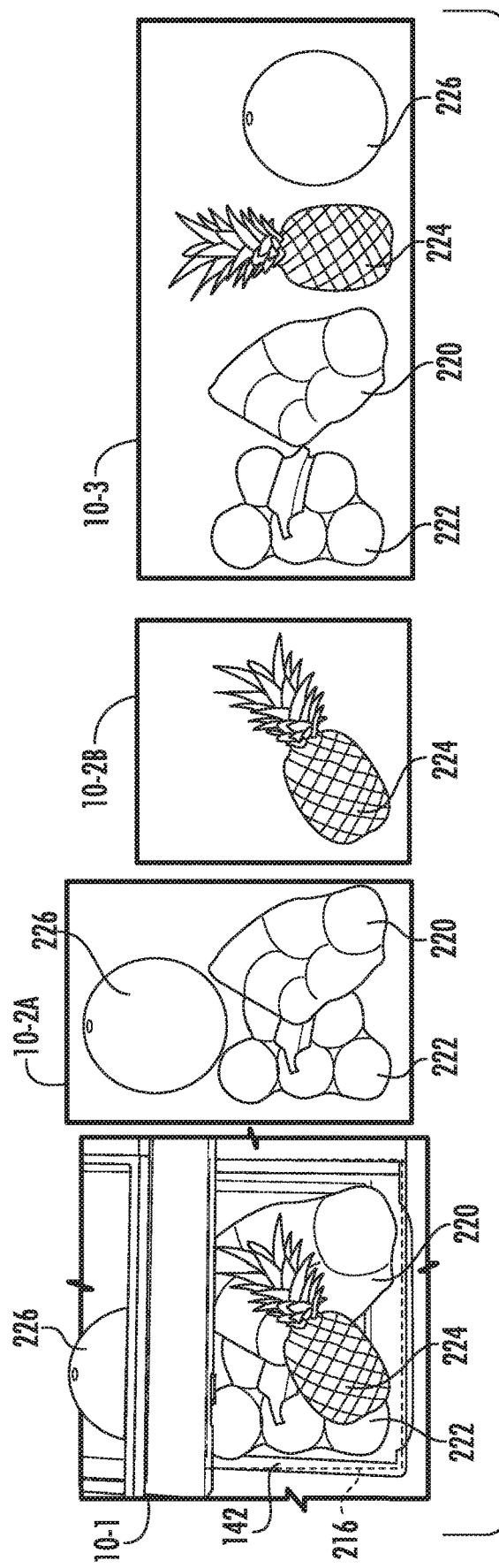
FIG. 10 illustrates a series of two-dimensional images of stored items in a drawer of a refrigerator appliance according to exemplary embodiments of the present disclosure.

Turning especially to FIG. 10, two-dimensional image 10-1 illustrates the first stored item 220, the second stored item 222, a third stored item 224 (e.g., a pineapple), and a fourth stored item 226 (e.g., a cantaloupe), captured within drawer 142 (e.g., subsequent to 9-1) while drawer 142 is in the predetermined bounding zone 216. Two-dimensional image 10-2A illustrates a two-dimensional isolated image that has been generated (e.g., by controller 150 from two-dimensional image 10-1 or 9-2) to show an isolated first layer within which the first stored item 220, second stored item 222, and fourth stored item 226 are held. Two-dimensional image 10-2B illustrates a two-dimensional isolated image that has been generated (e.g., by controller 150 from two-dimensional image 10-1) to show an isolated second layer within which the third stored item 224 is held. Two-dimensional image 10-3 illustrates a two-dimensional expanded image that has been generated (e.g., by controller 150 from two-dimensional images 10-2A and 10-2B) to show all of the stored items within drawer 142 at image 10-1 (i.e., first stored item 220, second stored item 222, fourth stored item 226, and third stored item 224) spaced apart from each other.

Figure 11:
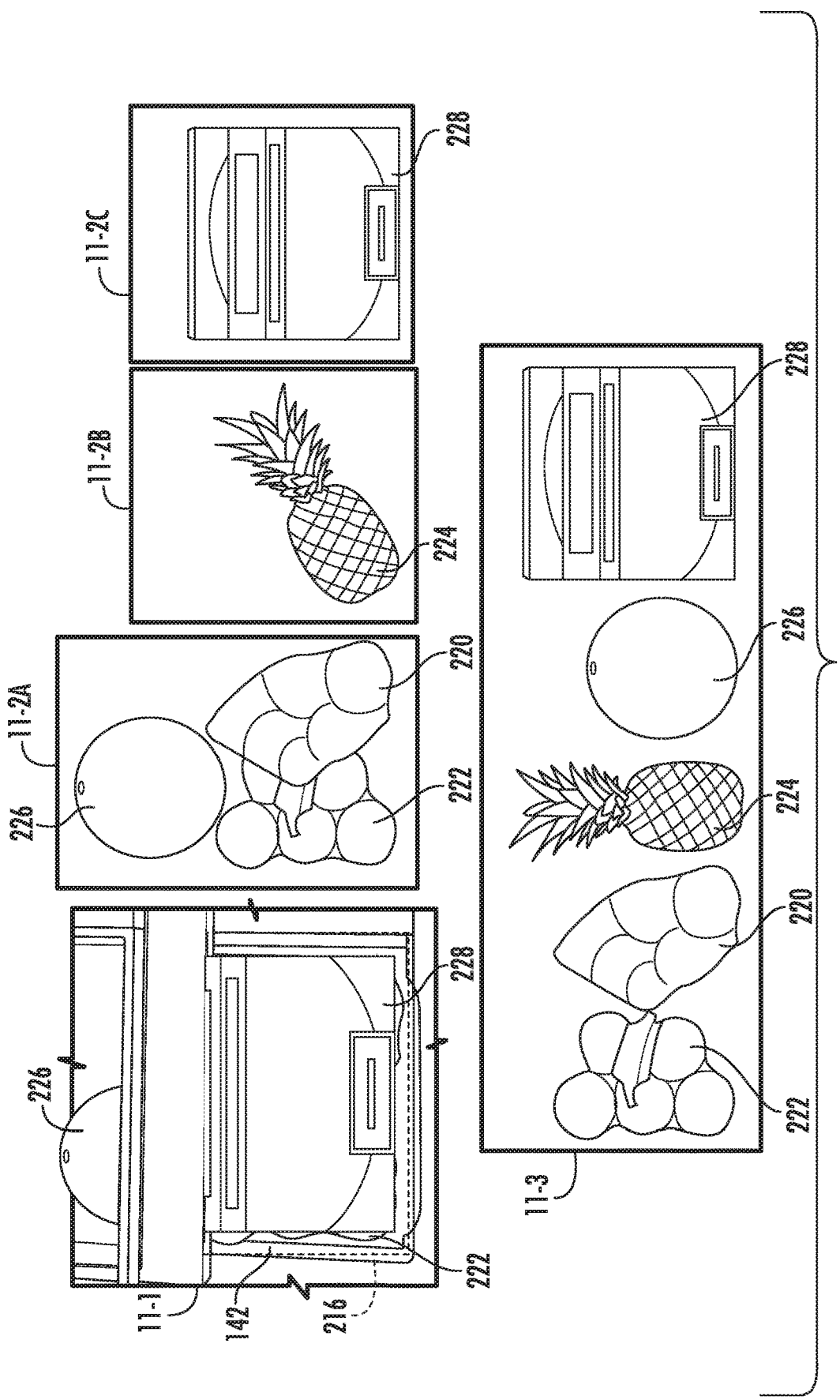
FIG. 11 illustrates a series of two-dimensional images of stored items in a drawer of a refrigerator appliance according to exemplary embodiments of the present disclosure.
Figure 12:
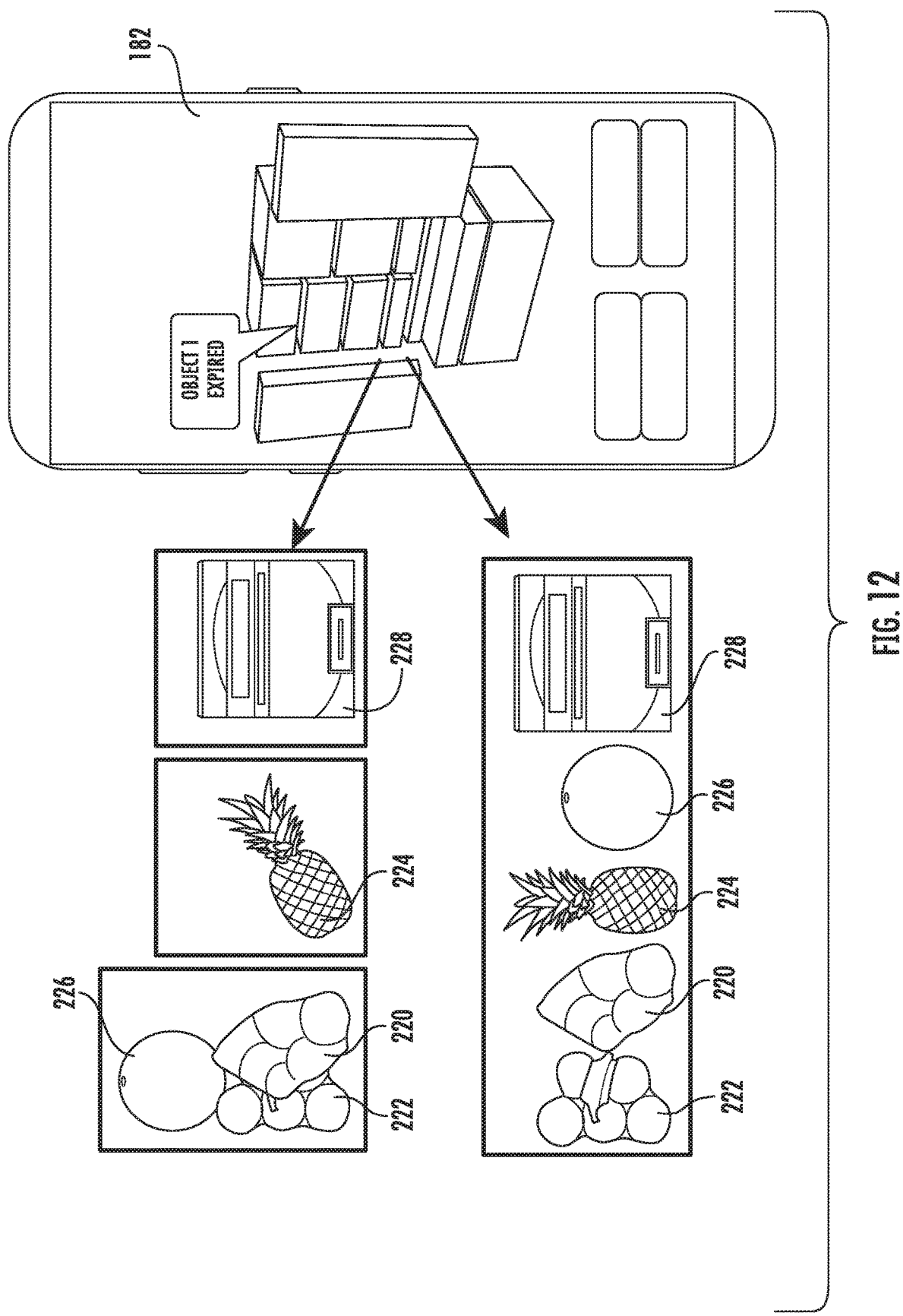
FIG. 12 illustrates a schematic view of two-dimensional images of stored items in a drawer of a refrigerator appliance viewable on a mobile display according to exemplary embodiments of the present disclosure.

Turning especially to FIG. 11, two-dimensional image 11-1 illustrates the first stored item 220, the second stored item 222, the third stored item 224, the fourth stored item 226, and a fifth stored item 228 (e.g., a refrigerated pizza) captured within drawer 142 (e.g., subsequent to 10-1) while drawer 142 is in the predetermined bounding zone 216. Two-dimensional image 11-2A illustrates a two-dimensional isolated image that has been generated (e.g., by controller 150 from two-dimensional image 11-1, 9-2, or 10-2A) to show an isolated first layer within which the first stored item 220, second stored item 222, and fourth stored item 226 are held. Two-dimensional image 11-2B illustrates a two-dimensional isolated image that has been generated (e.g., by controller 150 from two-dimensional image 11-1 or 10-2B) to show an isolated second layer within which the third stored item 224 is held. Two-dimensional image 11-2C illustrates a two-dimensional isolated image that has been generated (e.g., by controller 150 from two-dimensional image 11-1) to show an isolated second layer within which the fifth stored item 228 is held. Two-dimensional image 11-3 illustrates a two-dimensional expanded image that has been generated (e.g., by controller 150 from two-dimensional images 11-2A, 11-2B, and 11-2C) to show all of the stored items within drawer 142 at image 11-1 (i.e., first stored item 220, second stored item 222, third stored item 224, fourth stored item 226, and fifth stored item 228) spaced apart from each other.

Returning generally to FIGS. 8 through 12, in certain embodiments, controller 150 may be configured to record a descriptor of the identified stored items (e.g., within an inventory tracking or recording stored items within refrigerator appliance 100). As an example, the descriptor may include a string of text naming or generally describing the corresponding stored item. As an additional or alternative example, the descriptor may include an image corresponding to the stored item. Such an image of the descriptor may be a captured two-dimensional image (or portion thereof) from camera 160 or a preloaded image received from another remote source (e.g., a remote server).

As illustrated in FIGS. 8 through 12, an expanded two-dimensional image may be generated showing the stored items spaced apart from each other such that a user may readily understand what stored items have been captured and recognized. Such expanded images may be generated using portions of the captured images at the camera 160 (e.g., wherein captured portions of the stored items are isolated from each other and transferred to the expanded image) or from separate preloaded images stored or received at the controller 150 (e.g., wherein preloaded images of similar items are received from a remote server, such as an Internet server, and transferred to the expanded image). The isolated or expanded two-dimensional images may be presented to a user (e.g., at mobile display 182) to provide an easy-to-understand view of items within fresh food chamber 122. Optionally, such images may be presented with an internal location, such that a user may readily discern where a specific stored item is within fresh food chamber 122.

In additional or alternative embodiments, determination or selection of a specific layer may be recorded (e.g., with or as part of the descriptor) as a location for each stored item. In some such embodiments, the specific layer for each stored item may be based, at least in part, in the area of lower stored items that is covered by an upper stored item. For instance, as new stored items are placed within the drawer 142, a determination may be made whether a stored item covers a minimum captured area (e.g., preset minimum threshold percentage) of a captured area of the objects in the previous layers. In other words, if a new stored item is determined to cover or obscure at least the minimum captured area of the total captured area of stored items within drawer 142 (e.g., at an $n^{th}$ layer) prior to the new stored item's placement within drawer 142, the new stored item may be determined to occupy a higher layer (e.g., an immediately higher or $n^{th}+1$ layer). Generally, the captured area corresponds to the area (e.g., in square millimeters or pixels) occupied by the stored objects within the drawer 142 prior (e.g., immediately prior) to a new stored item being placed and detected within the drawer 142.

In optional embodiments, the minimum captured area is a preset value of 20%. In other embodiments, the minimum captured area is a preset value of 30%. In further embodiments, the minimum captured area is a preset value of 40%.

Using FIG. 10 as an example, in captured image 10-1, the third stored item 224 is determined to cover at least the minimum captured area of the total area defined by the first and second stored items 220, 222 (e.g., as determined from 9-1). Accordingly, the controller 150 may select a new, higher second layer in which the third stored item 224 is positioned. By contrast, the fourth stored item 226 does not cover any other stored items within the captured image of 10-1. Accordingly, the controller 150 may select the first layer in which the fourth stored item 226 is positioned.

Using FIG. 11 as a further example, in the captured image 11-1, the fifth stored item 228 is determined to cover at least the minimum captured area of the area defined by the third stored item 224 in the second layer. Accordingly, the controller 150 may select a new, higher third layer in which the fifth stored item 228 is positioned.

Figure 13:
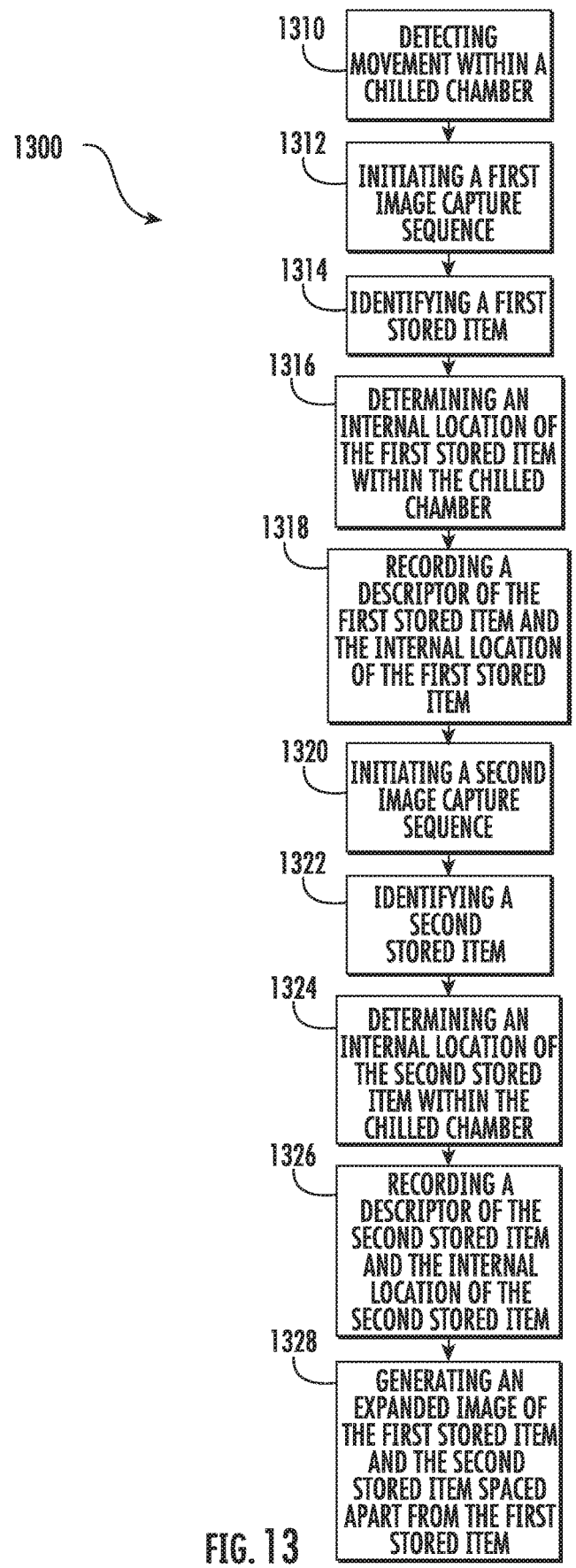
FIG. 13 provides a flow chart illustrating a method of operating a refrigerator appliance according to exemplary embodiments of the present disclosure.
Figure 14:
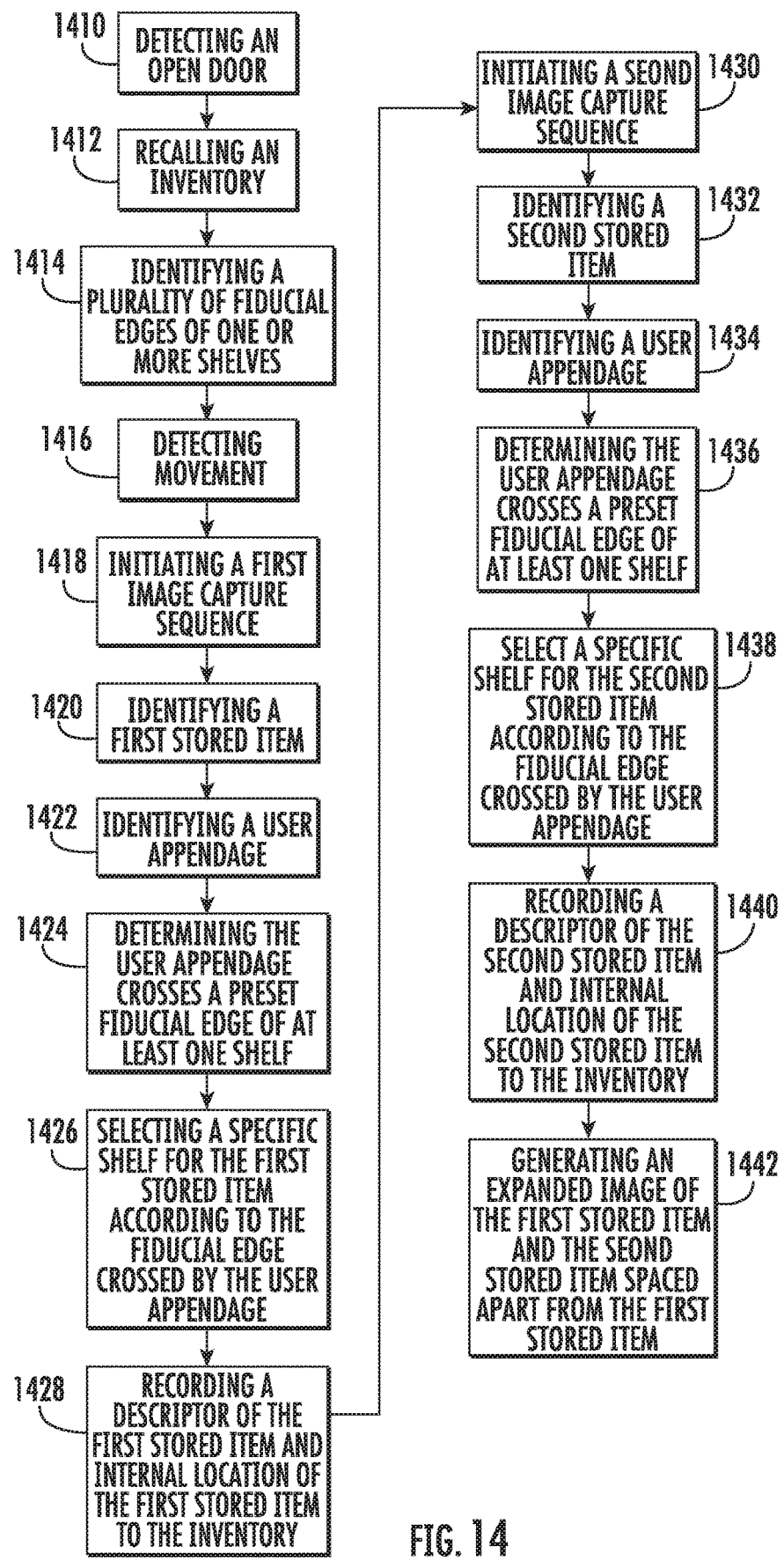
FIG. 14 provides a flow chart illustrating a method of operating a refrigerator appliance according to exemplary embodiments of the present disclosure.
Figure 15:
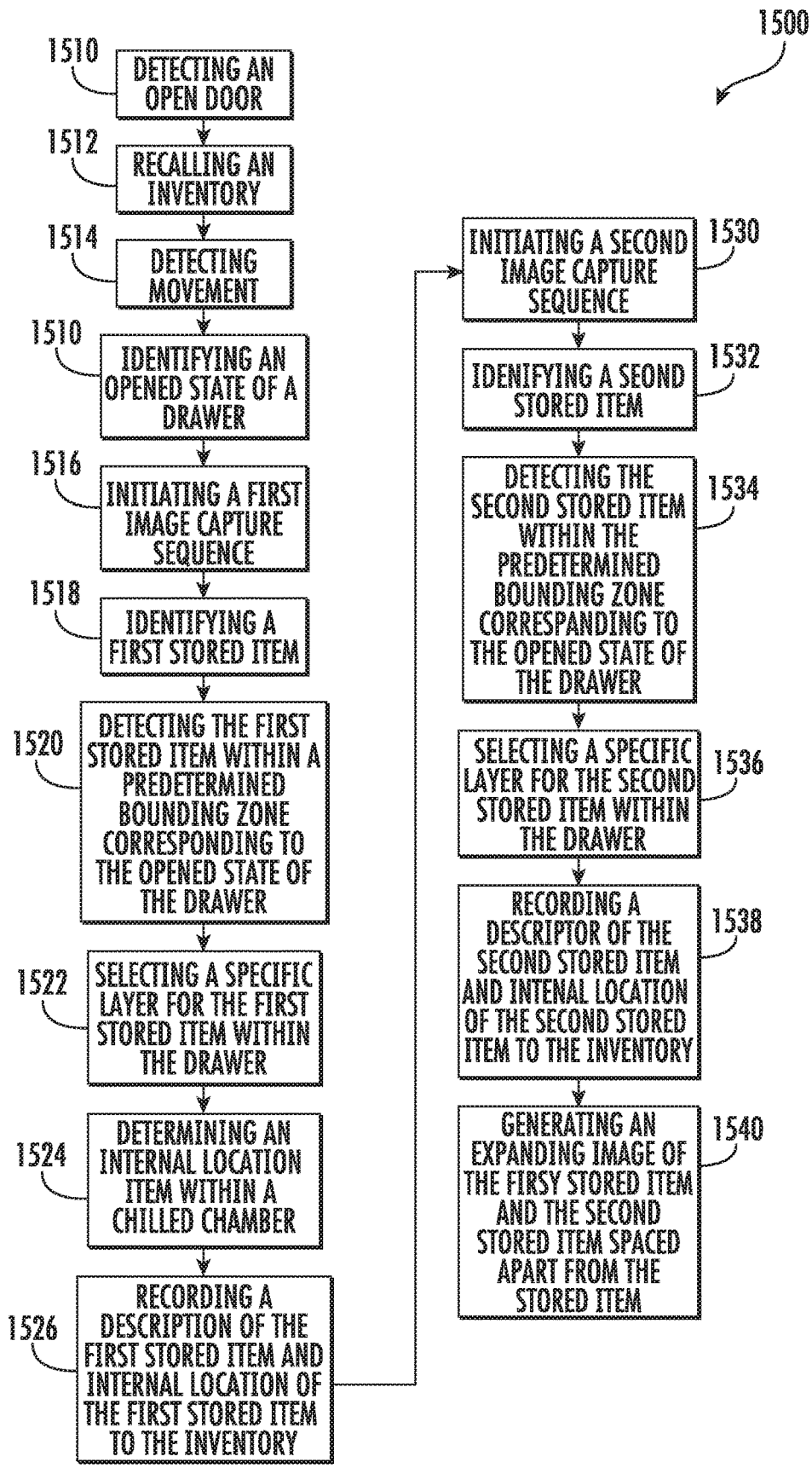
FIG. 15 provides a flow chart illustrating a method of operating a refrigerator appliance according to exemplary embodiments of the present disclosure.

Turning now to FIGS. 13 through 15, flow charts are provided of methods 1300, 1400, and 1500 according to example embodiments of the present disclosure. Generally, the methods 1300, 1400, and 1500 provide for methods of operating a refrigeration appliance 100 (FIG. 1) that includes a camera 160, as described above. The methods 1300, 1400, and 1500 can be performed, for instance, by the controller 150 (FIG. 3). For example, controller 150 may, as discussed, be in communication with camera 160, integrated display 180 (FIG. 3), or mobile display 182 (FIG. 3). During operations, controller 150 may send signals to and receive signals from camera 160, integrated display 180, or mobile display 182. Controller 150 may further be in communication with other suitable components of the appliance 100 to facilitate operation of the appliance 100 generally.

FIGS. 13 through 15 depict steps performed in a particular order for purpose of illustration and discussion. Those of ordinary skill in the art, using the disclosures provided herein, will understand that the steps of any of the methods disclosed herein can be modified, adapted, rearranged, omitted, or expanded in various ways without deviating from the scope of the present disclosure (except as otherwise described).

Turning especially to FIG. 13, at 1310, the method 1300 includes detecting movement within a chilled chamber (e.g., fresh food chamber) of the refrigerator appliance. As an example, movement may be detected at the camera module directed at the chilled chamber. Specifically, changes in light or pixels captured by the camera module may be detected (e.g., between multiple images captured over time) indicating the movement of one or more objects within the field of view of the camera module, as is generally understood.

The movement may be detected prior to a door of the refrigerator appliance being opening. For instance, detected changes in light or pixels may indicate that a refrigerator door selectively covering the chilled chamber is opened and that a user is intending/attempting to load or remove a stored item from the chilled chamber. As another example, movement may be detected in response to receiving a signal from a separate sensor, such as a switch selectively engaged with the door. Such switches are generally understood and may, for instance, simultaneously control activation of a light for illuminating the chilled chamber. Opening the refrigerator door may thus activate the light and transmit a signal indicating motion within the chilled chamber.

At 1312, the method 1300 includes initiating a first image capture sequence. The first image capture sequence may include capturing a plurality of two-dimensional images (e.g., a first two-dimensional image, subsequent second two-dimensional image, etc.), such as within a video feed or a series of sequential static images (e.g., taken or captured according to a predetermined rate or condition). Upon being captured at the camera module, the two-dimensional images may be transmitted to the controller (e.g., as a data signal). The two-dimensional images may then be recorded (e.g., temporarily) for comparison or evaluation.

In certain embodiments, the first image capture sequence is initiated in response to detecting movement at 1310. Thus, recording or evaluating two-dimensional images from the camera module may be prevented until movement is detected. Optionally, the first image capture sequence may continue until one or more end conditions are met. As an example, an end condition may include expiration of a predetermined time period (e.g., span of time) following the start of a corresponding detection of movement. As another example, an end condition may include failure to detect further changes in sequential images of the first image capture sequence. In other words, the first image capture sequence may end after sequential images stop changing or detecting further movement. The end condition may specifically require a preset number or time period of unchanged sequential images. As yet another example, an end condition may include detecting closure of the door to the chilled chamber. In other words, the first image capture sequence may end in response to the door being moved to the closed position.

At 1314, the method 1300 includes identifying a first stored item based on a first two-dimensional image of the first image capture sequence. In other words, using at least one two-dimensional image of the plurality of two-dimensional images captured at 1312, a first stored item (e.g., food item) may be recognized. The identification of 1314 may thus require the first stored item to pass beneath or within the field of view of the camera module, as described above. Thus, the first two-dimensional image may include at least a captured portion of the first stored item. Moreover, once captured, recognizing or identifying the first stored item may be performed by edge matching, divide-and-conquer search, greyscale matching, histograms of receptive field responses, or another suitable routine.

At 1316, the method 1300 includes determining an internal location of the first stored item within the chilled chamber. The internal location of the first stored item may be based, at least in part, on a second two-dimensional image of the first image capture sequence. Specifically, the second two-dimensional image of the first image capture sequence may be captured subsequent to the first two-dimensional image of the first image capture sequence. In other words, using at least one two-dimensional image of the plurality of two-dimensional images captured at 1312, the internal location of the first stored item (e.g., location within the chilled chamber that a user has placed the first stored item) may be determined.

In some embodiments, the internal location includes a particular shelf mounted within the chilled chamber. Determination of the internal location at 1316 may include identifying a user appendage within the second two-dimensional image of the first image capture sequence. The user appendage may be a hand or arm, as described above. Moreover, the user appendage may be identified as extending from or in contact with the first stored item. Once the user appendage is identified, 1316 may include determining the user appendage crosses a preset fiducial edge of at least one shelf mounted within the chilled chamber, as described above.

In additional or alternative embodiments, the internal location includes a particular drawer movably mounted within the chilled chamber. Determination of the internal location at 1316 may include identifying an opened state of a drawer based on one or more two-dimensional images of the first image capture sequence. For instance, as described above, the drawer may be detected within a predetermined bounding zone. Once the drawer is determined to be in the opened state, 1316 may include detecting the first stored item within a predetermined bounding zone. Optionally, the internal location may include a specific layer (e.g., first vertical layer) within the drawer, as described above.

At 1318, the method 1300 includes recording a descriptor of the first stored item and the internal location of the first stored item. Thus, the controller may provide both a descriptor and internal location of the first stored item (e.g., within the inventory that is recorded on controller). As described above, the descriptor may include text or an image. In optional embodiments, the descriptor of the first stored item includes at least a portion of the first two-dimensional image of the first image capture sequence. In alternative embodiments, the descriptor of the first stored item includes a received two-dimensional image captured separately from the refrigerator appliance (e.g., downloaded to the controller from a remote server). Thus, if the first stored item would be difficult for a user to visually distinguish in the first two-dimensional image, a separate image (e.g., preloaded image) may be presented of a substantially identical item.

At 1320, the method 1300 includes initiating a second image capture sequence. Similar to the first image capture sequence, the second image capture sequence may include capturing a plurality of two-dimensional images (e.g., a first two-dimensional image, subsequent second two-dimensional image, etc.), such as within a video feed or a series of sequential static images (e.g., taken or captured according to a predetermined rate or condition). Upon being captured at the camera module, the two-dimensional images may be transmitted to the controller (e.g., as a data signal). The two-dimensional images may then be recorded (e.g., temporarily) for comparison or evaluation.

Generally, 1320 occurs after (i.e., subsequent to) the first image capture sequence of 1312. In certain embodiments, the second image capture sequence is initiated in response to detecting movement following the first image capture sequence. For instance, between the first image capture sequence and the second image capture sequence, the door to the chilled chamber may be closed and a period of non-movement may occur. Optionally, the second image capture sequence may continue until one or more end conditions are met. The end condition(s) of the second image capture sequence may be identical to or distinct from the end condition(s) of the first image capture sequence. As an example, an end condition of the second image capture sequence may include expiration of a predetermined time period (e.g., span of time) following the start of a corresponding detection of movement. As another example, an end condition of the second image capture sequence may include failure to detect further changes in sequential images of the second image capture sequence. In other words, the second image capture sequence may end after sequential images stop changing or detecting further movement. The end condition of the second image capture sequence may specifically require a preset number or time period of unchanged sequential images. As yet another example, an end condition of the second image capture sequence may include detecting closure of the door to the chilled chamber. In other words, the second image capture sequence may end in response to the door being moved to the closed position.

At 1322, the method 1300 includes identifying a second stored item based on a first two-dimensional image of the second image capture sequence. In other words, using at least one two-dimensional image of the plurality of two-dimensional images captured at 1320, a second stored item (e.g., food item) may be recognized. The identification of 1322 may thus require the second stored item to pass beneath or within the field of view of the camera module, as described above. Thus, the first two-dimensional image of the second image capture sequence may include at least a captured portion of the second stored item. Moreover, once captured, recognizing or identifying the second stored item may be performed by edge matching, divide-and-conquer search, greyscale matching, histograms of receptive field responses, or another suitable routine.

At 1324, the method 1300 includes determining an internal location of the second stored item within the chilled chamber. The internal location of the second stored item may be based, at least in part, on a second two-dimensional image of the second image capture sequence. Specifically, the second two-dimensional image of the second image capture sequence may be captured subsequent to the first two-dimensional image of the second image capture sequence. In other words, using at least one two-dimensional image of the plurality of two-dimensional images captured at 1320, the internal location of the second stored item (e.g., location within the chilled chamber that a user has placed the second stored item) may be determined.

In some embodiments, the internal location includes a particular shelf 144 mounted within the chilled chamber. Determination of the internal location at 1324 may include identifying a user appendage within the second two-dimensional image of the second image capture sequence. The user appendage may be a hand or arm, as described above. Moreover, the user appendage may be identified as extending from or in contact with the second stored item. Once the user appendage is identified, 1324 may include determining the user appendage crosses a preset fiducial edge of at least one shelf mounted within the chilled chamber, as described above.

In additional or alternative embodiments, the internal location includes a particular drawer movably mounted within the chilled chamber. Determination of the internal location at 1324 may include identifying an opened state of a drawer based on one or more two-dimensional images of the second image capture sequence. For instance, as described above, the drawer may be detected within a predetermined bounding zone. Once the drawer is determined to be in the opened state, 1324 may include detecting the second stored item within the predetermined bounding zone. Optionally, the internal location may include a specific layer (e.g., first vertical layer or second vertical layer) within the drawer, as described above. As an example, based on the second two-dimensional image of the second image capture sequence, 1324 may include determining the second stored item covers a minimum captured area of the first layer. Moreover, 1324 may include selecting the internal location of the second stored item as a second vertical layer of the drawer in response to determining the second stored item covers the minimum captured area of the first layer, as described above. In some such embodiments, the minimum captured area of the first layer comprises at least 30% of a total captured area of the first stored item in the second two-dimensional image of the first image capture sequence.

At 1326, the method 1300 includes recording a descriptor of the second stored item and the internal location of the second stored item. Thus, the controller may provide both a descriptor and internal location of the second stored item (e.g., within the inventory that is recorded on controller). As described above, the descriptor may include text or an image. In optional embodiments, the descriptor of the second stored item includes at least a portion of the first two-dimensional image of the second image capture sequence. In alternative embodiments, the descriptor of the second stored item includes a received two-dimensional image captured separately from the refrigerator appliance (e.g., downloaded to the controller from a remote server). Thus, if the second stored item would be difficult for a user to visually distinguish in the first two-dimensional image, a separate image (e.g., preloaded image) may be presented of a substantially identical item.

At 1328, the method 1300 includes generating an expanded image of the first stored item and the second stored item spaced apart from the first stored item. In other words, 1328 provides a new image showing the first stored item (i.e., a picture thereof) spaced apart from the second stored item (i.e., a picture thereof). In some embodiments, the expanded image is generated from the images used as descriptors in 1318 and 1326. As an example, the expanded image may be generated using portions of images captured at the camera module during the first and second image capture sequences (e.g., wherein captured portions of the stored items are isolated from each other and transferred to the expanded image). As another example, the expanded image may be generated from separate preloaded images stored or received at the controller (e.g., wherein preloaded images of similar items are received from a remote server, such as an Internet server, and transferred to the expanded image).

Although described in terms of detecting first and second stored items as they are loaded or positioned within a chilled chamber, it is understood that 1300 may further include steps for detecting removal of the first or second stored items.

In some embodiments, 1300 further includes initiating a third image capture sequence following (i.e., subsequent to) the first image capture sequence (e.g., separate or independent from the second image capture sequence). In certain embodiments, the third image capture sequence is initiated in response to detecting movement following the first image capture sequence. For instance, between the first image capture sequence and the third image capture sequence, the door to the chilled chamber may be closed and a period of non-movement may occur. Optionally, the third image capture sequence may continue until one or more end conditions are met. The end condition(s) of the third image capture sequence may be identical to or distinct from the end condition(s) of the first image capture sequence. As an example, an end condition of the third image capture sequence may include expiration of a predetermined time period (e.g., span of time) following the start of a corresponding detection of movement. As another example, an end condition of the third image capture sequence may include failure to detect further changes in sequential images of the third image capture sequence. In other words, the third image capture sequence may end after sequential images stop changing or detecting further movement. The end condition of the third image capture sequence may specifically require a preset number or time period of unchanged sequential images. As yet another example, an end condition of the third image capture sequence may include detecting closure of the door to the chilled chamber. In other words, the third image capture sequence may end in response to the door being moved to the closed position.

In further embodiments, the method 1300 includes identifying a user appendage based on a first two-dimensional image of the third image capture sequence. The user appendage may be a hand or arm, as described above. Moreover, the user appendage may be identified as extending into the chilled chamber prior to any identification of a stored item during the third image capture sequence. Once the user appendage is identified, 1324 may include determining the user appendage crosses a preset fiducial edge of at least one shelf mounted within the chilled chamber, as described above.

Subsequent to identifying the user appendage of the third image capture sequence, the method 1300 may include determining removal of the first stored item from the chilled chamber based on a second two-dimensional image of the third image capture sequence. Specifically, the second two-dimensional image of the third image capture sequence may be captured subsequent to the first two-dimensional image of third first image capture sequence. Determining removal may, for instance, include identifying the first stored item extending from the user appendage following the user appendage crossing the preset fiducial edge.

Upon determining removal of the first stored item, the method 1300 may include discarding the descriptor of the first stored item and the internal location of the first stored item. For instance, the record of the first stored item may be deleted from the inventory of the controller.

Turning now especially to FIG. 14, at 1410, the method 1400 includes detecting an open door of the refrigerator appliance. For instance, the open door may be a refrigerator door selectively covering a chilled chamber (e.g., the fresh food chamber) and being in an opened position, as described above. Detecting the open door may include detecting changes in light or pixels at the camera module (e.g., from one or more images or signals received therefrom). Additionally or alternatively, detecting the open door may include receiving a signal from a separate sensor, such as a switch selectively engaged with the door (e.g., engaged with the door in a closed position). Such switches are generally understood and may, for instance, simultaneously control activation of a light for illuminating the chilled chamber. Opening the refrigerator door may thus activate the light and transmit a signal indicating motion within the chilled chamber.

At 1412, the method 1400 includes recalling the inventory of the appliance. Generally, the inventory may provide a chart or database of all stored items currently recognized or recorded as being within at least a portion of the refrigerator appliance (e.g., within fresh food chamber). Recalling the inventory may set the inventory in a condition where it may be viewable to a user (e.g., at the integrated display or mobile display) or changeable (e.g., by the controller).

At 1414, the method 1400 includes identifying a plurality of fiducial edges of one or more shelves within the chilled chamber. For instance, the fiducial edges of multiple shelves may be detected and selected from a two-dimensional image captured at the camera module after 1412. Optionally, a corresponding fiducial edge may be identified for each shelf within the fresh food chamber. As described above, the fiducial edges may establish a vertical coordinate system within the chilled chamber changes in At 1416, the method 1400 includes detecting movement with the chilled chamber. For instance, following 1412, the camera module may detect changes in light or pixels captured by the camera module (e.g., between multiple images captured over time) indicating the movement of one or more objects within the field of view of the camera module, as is generally understood.

At 1418, the method 1400 includes initiating a first image capture sequence. The first image capture sequence may include capturing a plurality of two-dimensional images (e.g., a first two-dimensional image, subsequent second two-dimensional image, etc.), such as within a video feed or a series of sequential static images (e.g., taken or captured according to a predetermined rate or condition). Upon being captured at the camera module, the two-dimensional images may be transmitted to the controller (e.g., as a data signal). The two-dimensional images may then be recorded (e.g., temporarily) for comparison or evaluation.

In certain embodiments, the first image capture sequence is initiated in response to detecting movement at 1416. Thus, recording or evaluating two-dimensional images from the camera module may be prevented until movement is detected. Optionally, the first image capture sequence may continue until one or more end conditions are met. As an example, an end condition may include expiration of a predetermined time period (e.g., span of time) following the start of a corresponding detection of movement. As another example, an end condition may include failure to detect further changes in sequential images of the first image capture sequence. In other words, the first image capture sequence may end after sequential images stop changing or detecting further movement. The end condition may specifically require a preset number or time period of unchanged sequential images. As yet another example, an end condition may include detecting closure of the door to the chilled chamber. In other words, the first image capture sequence may end in response to the door being moved to the closed position.

At 1420, the method 1400 includes identifying a first stored item. In some embodiments, the identification of 1420 is based on a first two-dimensional image of the first image capture sequence. In other words, using at least one two-dimensional image of the plurality of two-dimensional images captured at 1418, a first stored item (e.g., food item) may be recognized. The identification of 1420 may thus require the first stored item to pass beneath or within the field of view of the camera module, as described above. Thus, the first two-dimensional image may include at least a captured portion of the first stored item. Moreover, once captured, recognizing or identifying the first stored item may be performed by edge matching, divide-and-conquer search, greyscale matching, histograms of receptive field responses, or another suitable routine.

At 1422, the method 1400 includes identifying a user appendage. In some embodiments, the user appendage is identified in a second two-dimensional image of the first image capture sequence. As described above, the user appendage may be a hand or arm recognized by a suitable routine (e.g., edge matching, divide-and-conquer search, greyscale matching, or histograms of receptive field responses). Moreover, the user appendage may be identified as extending from or in contact with the first stored item.

At 1424, the method 1400 includes determining the user appendage crosses a preset fiducial edge of at least one shelf. As described above, crossing the preset fiducial edge may provide evidence that the user appendage (and by extension the first stored object) passes between vertically-adjacent shelves.

At 1426, the method 1400 includes selecting a specific shelf for the first stored item according to the fiducial edge at 1428.

At 1428, the method 1400 includes recording a descriptor of the first stored item and the internal location of the first stored item to the inventory. Thus, the controller may provide both a descriptor and internal location (e.g., selected shelf) of the first stored item. As described above, the descriptor may include text or an image. In optional embodiments, the descriptor of the first stored item includes at least a portion of the first two-dimensional image of the first image capture sequence. In alternative embodiments, the descriptor of the first stored item includes a received two-dimensional image captured separately from the refrigerator appliance (e.g., downloaded to the controller from a remote server). Thus, if the first stored item would be difficult for a user to visually distinguish in the first two-dimensional image, a separate image (e.g., preloaded image) may be presented of a substantially identical item.

At 1430, the method 1400 includes initiating a second image capture sequence. Similar to the first image capture sequence, the second image capture sequence may include capturing a plurality of two-dimensional images (e.g., a first two-dimensional image, subsequent second two-dimensional image, etc.), such as within a video feed or a series of sequential static images (e.g., taken or captured according to a predetermined rate or condition). Upon being captured at the camera module, the two-dimensional images may be transmitted to the controller (e.g., as a data signal). The two-dimensional images may then be recorded (e.g., temporarily) for comparison or evaluation.

Generally, 1430 occurs after (i.e., subsequent to) the first image capture sequence of 1420. In certain embodiments, the second image capture sequence is initiated in response to detecting movement following the first image capture sequence. For instance, between the first image capture sequence and the second image capture sequence, the door to the chilled chamber may be closed and a period of non-movement may occur. Optionally, the second image capture sequence may continue until one or more end conditions are met. The end condition(s) of the second image capture sequence may be identical to or distinct from the end condition(s) of the first image capture sequence. As an example, an end condition of the second image capture sequence may include expiration of a predetermined time period (e.g., span of time) following the start of a corresponding detection of movement. As another example, an end condition of the second image capture sequence may include failure to detect further changes in sequential images of the second image capture sequence. In other words, the second image capture sequence may end after sequential images stop changing or detecting further movement. The end condition of the second image capture sequence may specifically require a preset number or time period of unchanged sequential images. As yet another example, an end condition of the second image capture sequence may include detecting closure of the door to the chilled chamber. In other words, the second image capture sequence may end in response to the door being moved to the closed position.

At 1432, the method 1400 includes identifying a second stored item. In other words, using at least one two-dimensional image of the plurality of two-dimensional images captured at 1430, a second stored item (e.g., food item) may be recognized. The identification of 1432 may thus require the second stored item to pass beneath or within the field of view of the camera module, as described above. Thus, the first two-dimensional image of the second image capture sequence may include at least a captured portion of the second stored item. Moreover, once captured, recognizing or identifying the second stored item may be performed by edge matching, divide-and-conquer search, greyscale matching, histograms of receptive field responses, or another suitable routine.

At 1434, the method 1400 includes identifying a user appendage. In some embodiments, the user appendage is identified in a second two-dimensional image of the second image capture sequence. As described above, the user appendage may be a hand or arm recognized by a suitable routine (e.g., edge matching, divide-and-conquer search, greyscale matching, or histograms of receptive field responses). Moreover, the user appendage may be identified as extending from or in contact with the second stored item.

At 1436, the method 1400 includes determining the user appendage crosses a preset fiducial edge of at least one shelf. The at least one shelf of 1436 may this be different from or the same as the at least one shelf of 1426. As described above, crossing the preset fiducial edge may provide evidence that the user appendage (and by extension the second stored object) passes between vertically-adjacent shelves.

At 1438, the method 1400 includes selecting a specific shelf for the second stored item according to the fiducial edge at 1436.

At 1440, the method 1400 includes recording a descriptor of the second stored item and the internal location of the second stored item to the inventory. Thus, the controller may provide both a descriptor and internal location (e.g., selected shelf) of the second stored item. As described above, the descriptor may include text or an image. In optional embodiments, the descriptor of the second stored item includes at least a portion of the first two-dimensional image of the second image capture sequence. In alternative embodiments, the descriptor of the second stored item includes a received two-dimensional image captured separately from the refrigerator appliance (e.g., downloaded to the controller from a remote server). Thus, if the second stored item would be difficult for a user to visually distinguish in the first two-dimensional image, a separate image (e.g., preloaded image) may be presented of a substantially identical item.

At 1442, the method 1400 includes generating an expanded image of the first stored item and the second stored item spaced apart from the first stored item. In other words, 1442 provides a new image showing the first stored item (i.e., a picture thereof) spaced apart from the second stored item (i.e., a picture thereof). In some embodiments, the expanded image is generated from the images used as descriptors in 1428 and 1438. As an example, the expanded image may be generated using portions of images captured at the camera module during the first and second image capture sequences (e.g., wherein captured portions of the stored items are isolated from each other and transferred to the expanded image). As another example, the expanded image may be generated from separate preloaded images stored or received at the controller (e.g., wherein preloaded images of similar items are received from a remote server, such as an Internet server, and transferred to the expanded image).

Turning now especially to FIG. 15, at 1510, the method 1500 includes detecting an open door. For instance, the open door may be a refrigerator door selectively covering a chilled chamber (e.g., the fresh food chamber) and being in an opened position, as described above. Detecting the open door may include detecting changes in light or pixels at the camera module (e.g., from one or more images or signals received therefrom). Additionally or alternatively, detecting the open door may include receiving a signal from a separate sensor, such as a switch selectively engaged with the door (e.g., engaged with the door in a closed position). Such switches are generally understood and may, for instance, simultaneously control activation of a light for illuminating the chilled chamber. Opening the refrigerator door may thus activate the light and transmit a signal indicating motion within the chilled chamber.

At 1512, the method 1500 includes recalling the inventory of the appliance. Generally, the inventory may provide a chart or database of all stored items currently recognized or recorded as being within at least a portion of the refrigerator appliance (e.g., within fresh food chamber). Recalling the inventory may set the inventory in a condition where it may be viewable to a user (e.g., at the integrated display or mobile display) or changeable (e.g., by the controller).

At 1514, the method 1500 includes detecting movement with the chilled chamber. For instance, following 1512, the camera module may detect changes in light or pixels captured by the camera module (e.g., between multiple images captured over time) indicating the movement of one or more objects within the field of view of the camera module, as is generally understood.

At 1516, the method 1500 includes identifying an opened state of a drawer. For instance, as described above, the drawer may be detected within a predetermined bounding zone.

At 1518, the method 1500 includes initiating a first image capture sequence (e.g., following 1516). The first image capture sequence may include capturing a plurality of two-dimensional images (e.g., a first two-dimensional image, subsequent second two-dimensional image, etc.), such as within a video feed or a series of sequential static images (e.g., taken or captured according to a predetermined rate or condition). Upon being captured at the camera module, the two-dimensional images may be transmitted to the controller (e.g., as a data signal). The two-dimensional images may then be recorded (e.g., temporarily) for comparison or evaluation.

In certain embodiments, the first image capture sequence is initiated in response to identifying the drawer in the opened state at 1516. Thus, recording or evaluating two-dimensional images from the camera module may be prevented until movement is detected. Optionally, the first image capture sequence may continue until one or more end conditions are met. As an example, an end condition may include expiration of a predetermined time period (e.g., span of time) following the start of a corresponding detection of movement. As another example, an end condition may include failure to detect further changes in sequential images of the first image capture sequence. In other words, the first image capture sequence may end after sequential images stop changing or detecting further movement. The end condition may specifically require a preset number or time period of unchanged sequential images. As yet another example, an end condition may include detecting movement of the drawer to a closed position. In other words, the first image capture sequence may end in response to the drawer being moved away from the predetermined bounding zone.

At 1520, the method 1500 includes identifying a first stored item. In some embodiments, the identification of 1520 is based on a first two-dimensional image of the first image capture sequence. In other words, using at least one two-dimensional image of the plurality of two-dimensional images captured at 1518, a first stored item (e.g., food item) may be recognized. The identification of 1520 may thus require the first stored item to pass beneath or within the field of view of the camera module, as described above. Thus, the first two-dimensional image may include at least a captured portion of the first stored item. Moreover, once captured, recognizing or identifying the first stored item may be performed by edge matching, divide-and-conquer search, greyscale matching, histograms of receptive field responses, or another suitable routine.

At 1522, the method 1500 includes detecting the first stored item within a predetermined bounding zone corresponding to the opened state of the drawer. For instance, after 1516 and 1520, 1522 may include detecting the first stored item within a predetermined bounding zone.

At 1524, the method 1500 includes selecting a specific layer for the first stored item within the drawer. In some such embodiments, the specific layer for the first stored item may be based, at least in part, in the area of lower stored items that is covered by an upper stored item, as described above.

At 1526, the method 1500 includes determining an internal location of the first stored item within the chilled chamber. Specifically, the internal location may correspond to the specific layer selected at 1524.

At 1528, the method 1500 includes recording a descriptor of the first stored item and the internal location of the first stored item to the inventory. Thus, the controller may provide both a descriptor and internal location (e.g., selected layer) of the first stored item. As described above, the descriptor may include text or an image. In optional embodiments, the descriptor of the first stored item includes at least a portion of the first two-dimensional image of the first image capture sequence. In alternative embodiments, the descriptor of the first stored item includes a received two-dimensional image captured separately from the refrigerator appliance (e.g., downloaded to the controller from a remote server). Thus, if the first stored item would be difficult for a user to visually distinguish in the first two-dimensional image, a separate image (e.g., preloaded image) may be presented of a substantially identical item.

At 1530, the method 1500 includes initiating a second image capture sequence. Similar to the first image capture sequence, the second image capture sequence may include capturing a plurality of two-dimensional images (e.g., a first two-dimensional image, subsequent second two-dimensional image, etc.), such as within a video feed or a series of sequential static images (e.g., taken or captured according to a predetermined rate or condition). Upon being captured at the camera module, the two-dimensional images may be transmitted to the controller (e.g., as a data signal). The two-dimensional images may then be recorded (e.g., temporarily) for comparison or evaluation.

At 1532, the method 1500 includes identifying a second stored item. In other words, using at least one two-dimensional image of the plurality of two-dimensional images captured at 1530, a second stored item (e.g., food item) may be recognized. The identification of 1532 may thus require the second stored item to pass beneath or within the field of view of the camera module, as described above. Thus, the first two-dimensional image of the second image capture sequence may include at least a captured portion of the second stored item. Moreover, once captured, recognizing or identifying the second stored item may be performed by edge matching, divide-and-conquer search, greyscale matching, histograms of receptive field responses, or another suitable routine.

At 1534, the method 1500 includes detecting the second stored item within a predetermined bounding zone corresponding to the opened state of the drawer.

For instance, after 1516 and 1530, 1532 may include detecting the first stored item within a predetermined bounding zone.

At 1536, the method 1500 includes selecting a specific layer for the second stored item within the drawer. In some such embodiments, the specific layer for the second stored item may be based, at least in part, in the area of lower stored items that is covered by an upper stored item, as described above.

At 1538, the method 1500 includes determining an internal location of the second stored item within the chilled chamber. Specifically, the internal location may correspond to the specific layer selected at 1536.

At 1540, the method 1500 includes recording a descriptor of the second stored item and the internal location of the second stored item to the inventory.

Thus, the controller may provide both a descriptor and internal location (e.g., selected layer) of the second stored item. As described above, the descriptor may include text or an image. In optional embodiments, the descriptor of the second stored item includes at least a portion of the first two-dimensional image of the second image capture sequence. In alternative embodiments, the descriptor of the second stored item includes a received two-dimensional image captured separately from the refrigerator appliance (e.g., downloaded to the controller from a remote server). Thus, if the second stored item would be difficult for a user to visually distinguish in the first two-dimensional image, a separate image (e.g., preloaded image) may be presented of a substantially identical item.

At 1542, the method 1500 includes generating an expanded image of the first stored item and the second stored item spaced apart from the first stored item. In other words, 1542 provides a new image showing the first stored item (i.e., a picture thereof) spaced apart from the second stored item (i.e., a picture thereof). In some embodiments, the expanded image is generated from the images used as descriptors in 1528 and 1540. As an example, the expanded image may be generated using portions of images captured at the camera module during the first and second image capture sequences (e.g., wherein captured portions of the stored items are isolated from each other and transferred to the expanded image). As another example, the expanded image may be generated from separate preloaded images stored or received at the controller (e.g., wherein preloaded images of similar items are received from a remote server, such as an Internet server, and transferred to the expanded image).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a refrigerator appliance comprising a camera module mounted within a cabinet at a top portion of a chilled chamber, the method comprising:
   initiating a first image capture sequence at the camera module;
   identifying a first stored item based on a first two-dimensional image of the first image capture sequence;
   identifying a fixed fiducial marker of one or more shelves mounted within the cabinet to establish a vertical coordinate system;
   determining an internal location of the first stored item within the chilled chamber based on a second two-dimensional image of the first image capture sequence and the fixed fiducial marker by using the vertical coordinate system, the second two-dimensional image of the first image capture sequence being captured subsequent to the first two-dimensional image of the first image capture sequence;
   recording a descriptor of the first stored item and the internal location of the first stored item;
   initiating a third image capture sequence following the first image capture sequence;
   identifying a user appendage based on a first two-dimensional image of the third image capture sequence;
   determining removal of the first stored item from the chilled chamber based on a second two-dimensional image of the third image capture sequence, the second two-dimensional image of the third image capture sequence being captured subsequent to the first two-dimensional image of third first image capture sequence; and
   discarding the descriptor of the first stored item and the internal location of the first stored item.

2. The method of claim 1, wherein the descriptor of the first stored item comprises at least a portion of the first two-dimensional image of the first image capture sequence.

3. The method of claim 1, wherein the descriptor of the first stored item comprises a received two-dimensional image captured separately from the refrigerator appliance.

4. The method of claim 1, wherein determining the internal location of the first stored item comprises
   identifying a user appendage within the second two-dimensional image of the first image capture sequence, and
   determining the user appendage crosses a preset fiducial edge of at least one shelf mounted within the chilled chamber
   wherein the fiducial marker comprises the preset fiducial edge.

5. The method of claim 1, further comprising:
   initiating a second image capture sequence following the first image capture sequence;
   identifying a second stored item based on a first two-dimensional image of the second image capture sequence;
   determining an internal location of the second stored item within the chilled chamber based on a second two-dimensional image of the second image capture sequence, the second two-dimensional image of the second image capture sequence being captured subsequent to the first two-dimensional image of the second image capture sequence; and recording a descriptor of the second stored item and the internal location of the second stored item.

6. The method of claim 5, generating an expanded image of the first stored item and the second stored item spaced apart from the first stored item.

7. A method of operating a refrigerator appliance comprising a camera module mounted within a cabinet at a top portion of a chilled chamber, the method comprising:

initiating a first image capture sequence at the camera module;

identifying a first stored item based on a first two-dimensional image of the first image capture sequence;

identifying a fixed fiducial marker of one or more shelves mounted within the cabinet to establish a vertical coordinate system;

determining an internal location of the first stored item within the chilled chamber based on a second two-dimensional image of the first image capture sequence and the fixed fiducial marker by using the vertical coordinate system, the second two-dimensional image of the first image capture sequence being captured subsequent to the first two-dimensional image of the first image capture sequence;

recording a descriptor of the first stored item and the internal location of the first stored item;

initiating a second image capture sequence following the first image capture sequence;

identifying a second stored item based on a first two-dimensional image of the second image capture sequence;

determining an internal location of the second stored item within the chilled chamber based on a second two-dimensional image of the second image capture sequence, the second two-dimensional image of the second image capture sequence being captured subsequent to the first two-dimensional image of the second image capture sequence; and recording a descriptor of the second stored item and the internal location of the second stored item, wherein determining the internal location of the second stored item comprises
identifying the opened state of the drawer based on one or more two-dimensional images of the second image capture sequence, and
detecting the second stored item within the predetermined bounding area corresponding to the opened state of the drawer, wherein determining the internal location of the first stored item comprises
identifying an opened state of a drawer based on one or more two-dimensional images of the first image capture sequence, and
detecting the first stored item within a predetermined bounding area corresponding to the opened state of the drawer, and wherein determining the internal location of the second stored item further comprises
determining the second stored item covers a minimum captured area of the first layer based on the second two-dimensional image of the second image capture sequence, and
selecting the internal location of the second stored item as a second vertical layer of the drawer in response to determining the second stored item covers the minimum captured area of the first layer.

8. The method of claim 7, wherein the internal location of the first stored item comprises a first vertical layer within the drawer.

9. The method of claim 7, wherein the minimum captured area of the first vertical layer comprises at least 30% of a total captured area of the first stored item in the second two-dimensional image of the first image capture sequence.

10. The method of claim 7, further comprising:
generating an expanded image of the first stored item and the second stored item spaced apart from the first stored item.

11. A method of operating a refrigerator comprising a camera module mounted within a cabinet at a top portion of a chilled chamber, the method comprising:

initiating a first image capture sequence at the camera module;

identifying a first stored item based on a first two-dimensional image of the first image capture sequence;

recording an image of the first stored item;

initiating a second image capture sequence following the first image capture sequence;

identifying a second stored item based on a first two-dimensional image of the second image capture sequence;

recording an image of the second stored item; and generating an expanded image of the first stored item and the second stored item spaced apart from the first stored item.

12. The method of claim 11, wherein the image of the first stored item comprises at least a portion of the first two-dimensional image of the first image capture sequence.

13. The method of claim 11, wherein the image of the first stored item comprises a received two-dimensional image captured separately from the refrigerator.

14. The method of claim 11, further comprising:
initiating a third image capture sequence following the first image capture sequence;
identifying a user appendage based on a first two-dimensional image of the third image capture sequence;
determining removal of the first stored item from the chilled chamber based on a second two-dimensional image of the third image capture sequence, the second two-dimensional image of the third image capture sequence being captured subsequent to the first two-dimensional image of third first image capture sequence; and
discarding the image of the first stored item.

15. The method of claim 11, further comprising:
identifying an opened state of a drawer based on one or more two-dimensional images of the first image capture sequence;
detecting the first stored item within a predetermined bounding area corresponding to the opened state of the drawer; and
recording an internal location of the first stored item as a first vertical layer within the drawer.

16. The method of claim 15, further comprising
identifying the opened state of the drawer based on one or more two-dimensional images of the second image capture sequence;
detecting the second stored item within the predetermined bounding area corresponding to the opened state of the drawer;

determining the second stored item covers a minimum captured area of the first vertical layer based on the second two-dimensional image of the second image capture sequence; and recording an internal location of the second stored item as a second vertical layer of the drawer in response to determining the second stored item covers the minimum captured area of the first vertical layer.

17. The method of claim 16, wherein the minimum captured area of the first vertical layer comprises at least 30% of a total captured area of the first stored item in the second two-dimensional image of the first image capture sequence.

\* \* \* \* \*